(12) United States Patent
Harada et al.

(10) Patent No.: US 7,725,998 B2
(45) Date of Patent: Jun. 1, 2010

(54) WASHING-MACHINE DISASSEMBLING METHOD AND DISASSEMBLING APPARATUS, RECYCLED RESIN AND RESIN PRODUCT

(75) Inventors: Naoyuki Harada, Osaka (JP); Yohei Kawaguchi, Osaka (JP); Ryuzo Hori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1221 days.

(21) Appl. No.: 10/557,282

(22) PCT Filed: May 25, 2004

(86) PCT No.: PCT/JP2004/007468

§ 371 (c)(1),
(2), (4) Date: Nov. 17, 2005

(87) PCT Pub. No.: WO2004/105973

PCT Pub. Date: Dec. 9, 2004

(65) Prior Publication Data

US 2007/0056152 A1    Mar. 15, 2007

(30) Foreign Application Priority Data

May 27, 2003  (JP) .............................. 2003-149132
Nov. 28, 2003  (JP) .............................. 2003-400228

(51) Int. Cl.
*B23P 19/00* (2006.01)
*B23P 21/00* (2006.01)

(52) U.S. Cl. ............................ 29/426.5; 29/710; 29/721

(58) Field of Classification Search ................ 29/426.5, 29/403.3, 403.1, 403.2, 564.1, 700, 710, 29/721
See application file for complete search history.

(56) References Cited

FOREIGN PATENT DOCUMENTS

| JP | 64-42888 | 3/1989 |
|----|----------|--------|
| JP | 08-155875 | 6/1996 |
| JP | 09-300127 | 11/1997 |
| JP | 11-212471 | 8/1999 |
| JP | 11-255467 | 9/1999 |
| JP | 2000-254383 | 9/2000 |
| JP | 2000-271378 | 10/2000 |
| JP | 2000-271385 | 10/2000 |
| JP | 2001-062187 | 3/2001 |
| JP | 2002-021831 | 1/2002 |
| JP | 2002-240037 | 8/2002 |
| JP | 2003-047121 | 2/2003 |
| JP | 2003-089116 | 3/2003 |
| JP | 2003-094982 | 4/2003 |

*Primary Examiner*—John C Hong
(74) *Attorney, Agent, or Firm*—David G. Conlin; Steven M. Jensen; Edwards Angell Palmer & Dodge LLP

(57) ABSTRACT

A method of disassembling a washing machine is a disassembling method for a washing machine including a reduction-gear unit secured on the outside of a water tub and a dehydration tub disposed in the water tub, and the method includes a release step of applying force, along the axial direction of a rotary shaft, in the direction of separating the reduction-gear unit and the dehydration tub from each other to release connection between the reduction-gear unit and the dehydration tub. This scheme can be employed to provide a method of disassembling a washing machine that can recover resin included in the washing machine at a high recovery ratio.

21 Claims, 20 Drawing Sheets

WASHING-MACHINE DISASSEMBLING METHOD AND DISASSEMBLING APPARATUS, RECYCLED RESIN AND RESIN PRODUCT

TECHNICAL FIELD

The present invention relates to a method and an apparatus for disassembling a washing machine. The invention also relates to a recycled resin and a resin product. In particular, the invention relates to a method and an apparatus for removing resin from a washing machine.

BACKGROUND ART

Among constituent parts of a washing machine, plastic parts were rarely recycled. In recent years, recycling of plastic parts has been increasing. Regarding how to recycle plastic parts, various methods have been proposed. For example, Japanese Patent Laying-Open No. 2002-240037 proposes a method according to which plastic parts are separately collected and recycled. This method separately collects, from waste products, the same plastic parts having the same composition, crushes and thereafter melts the plastic parts for reuse.

Some recycling plants are recycling washing machines based on this method. A washing machine is manually disassembled into small parts. The separated parts are grouped according to the material of which the parts are made. As for plastic parts, they are grouped according to the type of plastic, and thereafter crushed, washed and formed into pellets. The pellets are used again as materials for producing washing machines. This process is so-called horizontal recycling. Among plastic parts, a water tub is higher in plastic content used therefor. The water tub is also manually detached from the washing machine.

FIG. 23 is a schematic cross-sectional view of a washing machine. A housing 20 has its top where a control panel for example is disposed and its inside where such a main component as a water tub 11 is disposed. In water tub 11, a dehydration tub 12 is disposed. Wash water fills the inside of water tub 11 and clothes to be cleaned are put in dehydration tub 12. Dehydration tub 12 has its bottom where a pulsator 13 is disposed. Pulsator 13 is secured to a rotary shaft 16. Rotary shaft 16 is connected to a reduction-gear unit 14. Water tub 11 has its bottom where a motor 21 is disposed. Rotational motion of motor 21 is transmitted through a belt 24 to gears in reduction-gear unit 14. The rotational motion reduced in speed in reduction-gear unit 14 is transmitted to rotary shaft 16 to rotate pulsator 13 and thereby stir the wash water. The clothes are washed by the stirred flow. In removing water from the clothes, dehydration tub 12 and pulsator 13 rotate together.

While dehydration tub 12 is rotating, water tub 11 does not rotate in a washing process. Reduction-gear unit 14 at the bottom of water tub 11 is secured with clamp bolts 23 to water tub 11. Motor 21 is secured to water tub 11 as well. Around reduction-gear unit 14, a transport angle 22 is disposed. Transport angle 22 is formed for protecting reduction-gear unit 14 and a pulley of reduction-gear unit 14 from shock for example during transport of the washing machine. Transport angle 22 is formed in the shape of a belt to surround reduction-gear unit 14 and is secured to water tub 11 with screws.

When the washing machine is disassembled at a recycling plant, water tub 11 is first removed from housing 20. At this time, dehydration tub 12, pulsator 13, reduction-gear unit 14 and motor 21 for example are still attached to water tub 11. From the water tub in this state, transport angle 22 is detached and thereafter motor 21 and belt 24 are detached. Motor 21 and belt 24 are detached easily by removing screws attached to water tub 11 that are used for securing the motor. Further, clamp bolts 23 are detached. At the bottom of the water tub, in addition to the motor, the reduction-gear unit, a reduction-gear frame and the transport angle, a solenoid valve, wires and hoses for example are disposed. Water tub 11 which is removed from housing 20 and from which at least transport angle 22, motor 21 and belt 24 are thereafter detached and further clamp bolts 23 are detached is herein referred to as "water-tub unit."

FIG. 24 shows a partial cross-sectional view of water-tub unit 1. Water tub 11 is in the shape of a cylinder with its top opened and is made of plastic. In water tub 11, dehydration tub 12 in the shape of a cylinder with its top opened is formed. Pulsator 13 disposed at the bottom of dehydration tub 12 is planar in shape. In other words, the pulsator formed here is longer in its outer diameter at the bottom as compared with its dimension in the direction of the rotational axis. Rotary shaft 16 includes a dehydration-tub rotary shaft 16a for rotating the dehydration tub and a pulsator rotary shaft 16b for rotating the pulsator. Pulsator rotary shaft 16b is formed in the shape of a solid cylinder and dehydration-tub rotary shaft 16a is formed in the shape of a hollow cylinder to surround the pulsator rotary shaft. Pulsator 13 is secured with a pulsator securing screw 18 to pulsator rotary shaft 16b. Rotary shaft 16 extends through dehydration tub 12 and water tub 11 to be connected to reduction-gear unit 14 disposed at the bottom of water tub 11. At the through portion of dehydration tub 12, a dehydration-tub flange 19 is provided. With a dehydration-tub securing nut 17, dehydration flange 19 and dehydration-tub rotary shaft 16a are secured. Reduction-gear unit 14 includes a plate portion 10. Plate portion 10 is a portion that is secured with the clamp bolts to reduction-gear frame 15 that is secured to the bottom of water tub 11. Reduction-gear frame 15 has a protruding portion formed. Between plate portion 10 and the bottom of water tub 11, a gap is formed. Reduction-gear unit 14 is secured to allow a part thereof to be fit in water tub 11.

In order to disassemble water-tub unit 1, pulsator-securing screw 18 fastened at the top of pulsator 13 is loosened to be detached. After this, pulsator 13 is removed from the inside of dehydration tub 12. Then, dehydration-tub securing nut 17 coupling dehydration tub 12 and dehydration-tub rotary shaft 16a is detached to remove dehydration tub 12 from water tub 11. Depending on the structure of the washing machine, impact force is applied to rotary shaft 16 extending through dehydration tub 12 for detaching dehydration tub 12.

In this way, pulsator 13 and dehydration tub 12 can be separated from the water-tub unit. Since rotary shaft 16 from which dehydration tub 12 is detached is in the shape of a rod, the integrated reduction-gear unit 14 and rotary shaft 16 can be detached from water tub 11 in the downward direction as seen in the drawing. Components mounted on the periphery are thereafter detached so that only water tub 11 is left.

The description above is applied to an example of the washing machine. For disassembling any washing machine of a different structure, it has been necessary as well, because of structural reasons, to completely disassemble the coupling of the pulsator, dehydration tub and rotary shaft and thereby remove first the pulsator and dehydration tub from the water tub. A mechanical disassembling method that differs from the manual one is disclosed for example in Japanese Patent Laying-Open No. 9-300127 according to which mechanical cutting is done in the circumferential direction of the body of the water tub.

The manufacturer and the year of manufacture of washing machines to be recycled differ between the washing machines. If washing machines are different from each other in manufacturer and year of manufacture, they also differ in structure. Among such washing machines, some washing machines may be difficult to manually disassemble. Further, the washing machines may have been used for years that range from a few years to 20 years or longer and thus some washing machines may be difficult to manually disassemble due to the presence of rust or scale formed on the machines. Furthermore, some washing machines may be difficult to easily disassemble due to detergent residues left concentratedly at some portions of the washing machines.

Specifically, the pulsator-securing screw that secures the pulsator to the pulsator rotary shaft is difficult to be reached by a tool and is at the position that is difficult to discern. There was thus such a problem as the requirement of a special tool or longer time taken for fitting a tool in the screw slot. Further, depending on the joint portion between the pulsator and the pulsator rotary shaft or the material of which the bearing portion of the pulsator was made, or the years for which the machine had been used, there was the case where the pulsator could not easily be detached even after the pulsator securing screw was detached, due to the presence of rust or scale. In such a case, the water-tub unit was disassembled, for example, by being thrown against the floor with the opening side facing downward or using a crowbar to break the pulsator itself Thus, in such a case where the pulsator could not easily be detached from the dehydration tub, considerable effort was required.

In addition, since the opposing sides of the dehydration-tub securing nut have such a large dimension as the one ranging from 38 mm to 41 mm, a special tool is required to detach the dehydration-tub securing nut. However, the dehydration-tub securing nut is disposed at the bottom of the dehydration tub, and thus the nut is considerably difficult to be reached by the tool. Thus, there was a resultant problem of low workability in such a state where the dehydration tub was incorporated in the washing machine. Further, there was the case where scale or detergent residue was attached between the rotary shaft and the dehydration-tub flange and thus considerable time and cost were required to remove the dehydration tub from the water tub.

As seen from the above, the manual disassembling required enormous efforts and long time in some cases. When the time consumed was excessively long, the disassembly was abandoned and the washing machine was crushed and discarded without being recycled.

The mechanical cutting method as disclosed in Japanese Patent Laying-Open No. 9-0300127 may be used to remove the water tub without releasing the coupling between the water tub and the rotary shaft. However, the water tub is cut along one plane including the circumferential periphery of the water tub. The method thus allows only 50 to 70% of plastic relative to the total weight of the water tub to be recovered. Another disadvantage is that the larger the water tub in size, the lower the ratio of recovery.

An object of the present invention is to provide an apparatus and a method for disassembling a washing machine that can recover resin from the washing machine at a high recovery ratio. Another object of the present invention is to provide a recycled resin and a resin product that have high quality.

DISCLOSURE OF THE INVENTION

A method of disassembling a washing machine according to the present invention, in a first aspect, includes a gear-unit pulling-off step of separating a reduction-gear unit secured to a water tub from the water tub, and the gear-unit pulling-off step includes the step of pulling out the reduction-gear unit from a dehydration-tub rotary shaft. This method can be employed to facilitate separation of the water tub and a dehydration tub from each other and shorten the time for disassembly. Further, a material for the water tub can be recovered at a high recovery ratio.

A method of disassembling a washing machine according to the present invention, in a second aspect, includes a gear-unit pulling-off step of separating a reduction-gear unit secured to a water tub from the water tub, and the gear-unit pulling-off step includes the step of pulling out the reduction-gear unit and a dehydration-tub rotary shaft from the water tub while dividing a dehydration-tub flange for securing a dehydration tub disposed in the water tub to the dehydration-tub rotary shaft. This method can be employed to facilitate separation of the water tub and the dehydration tub from each other and shorten the time for disassembly. Further, a material for the water tub can be recovered at a high recovery ratio.

In the case where the washing machine has a pulsator larger in dimension in the direction of the rotational axis than external diameter at a bottom portion, this method can be employed to enhance the above-described effects.

A disassembling apparatus for a washing machine according to the present invention, in a first aspect, includes holding means for holding a reduction-gear unit, moving means for moving the holding means, and movement inhibiting means for inhibiting movement of a water tub when the holding means that holds the reduction-gear unit is moved. This structure can be employed to facilitate separation of the water tub and the dehydration tub from each other and shorten the time for disassembly. Further, a material for the water tub can be recovered at a high recovery ratio.

Preferably, the invention includes a frame, the holding means includes an open/close hook formed at an upper portion of the frame and facing downward, the moving means includes a hydraulic cylinder for moving up-and-down the open/close hook, and the movement inhibiting means includes a press plate for pressing the water tub in the downward direction. Further, the press plate is formed to protrude from the frame in the horizontal direction. This structure can be employed to form the disassembling apparatus using known parts.

A disassembling method for disassembling a washing machine according to the present invention, in a third aspect, is a method for disassembling a washing machine that includes: a vessel formed of resin; a driven unit making a rotational movement in the vessel; and a drive unit connected through a coupling rod to the driven unit and disposed on the outside of the vessel. The method includes a release step of applying force, along the axial direction of the coupling rod, in the direction of separating the drive unit and the driven unit from each other to release the connection between the drive unit and the driven unit. This method can be employed to facilitate separation of the drive unit and the driven unit from each other and shorten the time for disassembly. Further, a material for the water tub can be recovered at a high recovery ratio.

According to the present invention, preferably, in the release step, the drive unit is held, pressed or caught and the driven unit is held, pressed or caught to separate the drive unit and the driven unit away from each other. This method can be employed to easily apply force in the direction of separating the drive unit and the driven unit from each other.

According to the present invention, preferably, in the release step, the drive unit is held, pressed or caught and the vessel is held, pressed or caught to separate the drive unit and the vessel away from each other. This method can be employed to easily apply force in the direction of separating the drive unit and the driven unit from each other.

According to the present invention, preferably, in the release step, a member having its leading end in the shape of a rod or its leading end in the shape of a plate catches the drive unit and force is applied to the member. This method can be employed to catch the drive unit using a small space or the like. Further, the member having its leading end in the shape of the plate can be used to increase the area of contact between the drive unit and the member and the drive unit can stably be caught.

According to the present invention, preferably, the vessel includes a water tub, the drive unit includes at least one of a motor and a reduction-gear unit, and the driven unit includes at least one of a dehydration tub and a pulsator. This method can be employed to recover resin from the water tub at a high recovery ratio.

According to the present invention, preferably, the method includes, prior to the release step, at least one of the step, in a case where the vessel and the drive unit are in contact with and coupled to each other, of releasing the coupling between the vessel and the drive unit, the step, in a case where the vessel and the drive unit are secured through a metal component, of releasing coupling between the metal component and the drive unit, and the step of releasing coupling between the metal component and the vessel. This method can be employed to select a component to be separated in the release step.

According to the present invention, preferably, the method includes, after the release step, the step of removing oil leaking from the drive unit. This method can be employed to recover resin of high quality.

A disassembling apparatus for disassembling a washing machine according to the present invention, in a second aspect, is a disassembling apparatus for a washing machine including: a vessel formed of resin; a driven unit making a rotational movement in the vessel; and a drive unit connected through a coupling rod to the driven unit and disposed on the outside of the vessel. The apparatus includes separating means for applying force, along the axial direction of the coupling rod, in the direction of separating the drive unit and the driven unit from each other. This structure can be employed to facilitate separation of the drive unit and the driven unit from each other and recover resin at a high recovery ratio.

According to the present invention, preferably, the separating means includes: drive-unit holding means for holding the drive unit; driven-unit holding means for holding the driven unit; and first moving means for moving, along the axial direction, at least one of the drive-unit holding means and the driven-unit holding means. Alternatively, the separating means includes: drive-unit grasping means for catching the drive unit; driven-unit holding means for holding the driven unit; and second moving means for moving, along the axial direction, at least one of the drive-unit grasping means and the driven-unit holding means. Alternatively, the separating means includes: drive-unit holding means for holding the drive unit; vessel holding means for holding the vessel; and third moving means for moving, along the axial direction, at least one of the drive-unit holding means and the vessel holding means. Any of these structures can be used to easily form the separating means.

According to the present invention, preferably, the separating means includes: drive-unit grasping means for catching the drive unit; vessel pressing means for pressing the vessel; and fourth moving means for moving, along the axial direction, at least one of the drive-unit grasping means and the vessel pressing means. This structure can be employed to easily form the separating means.

According to the present invention, preferably, the vessel pressing means is formed to press the vessel toward one of the sides in the axial direction, and the drive-unit grasping means is formed to move toward the other side. This structure can be employed to easily structure the separating means.

According to the present invention, preferably, the vessel pressing means includes a press rod formed to press a bottom portion of the vessel to be disposed. This structure can be employed to easily form the vessel pressing means.

According to the present invention, preferably, the press rod is formed to be movable to change the position where the bottom portion is pressed. This structure can be employed to use the washing-machine disassembling apparatus for various types of washing machines.

According to the present invention, preferably, the press rod has a press plate whose shape in plan view is sector, at a portion where the press rod presses the bottom portion. This structure can be employed to effectively press the vessel even in the case where an uneven portion like rib is formed at a portion where the vessel is pressed or in the case where the metal component in plan view is in any shape other than rectangle and the region where the press plate is disposed is small. Further, the area of contact with the vessel is increased to stably press the vessel.

According to the present invention, preferably, the drive-unit holding means or drive-unit grasping means is formed in an upper portion, and the drive-unit holding means or drive-unit grasping means is formed to hold the drive unit from above when the vessel is disposed with the drive unit on an upper side. This structure can be employed to improve workability in disassembling the washing machine.

According to the present invention, preferably, the apparatus includes a table for disposing an object to be disassembled, and the table is formed to have a movable mount surface. This structure can be employed to allow the drive-unit grasping means to easily catch the drive unit and allow the drive-unit holding means to easily hold the drive unit.

According to the present invention, preferably, the drive-unit grasping means includes an open/close hook formed to freely open and close, and the open/close hook has a leading end for catching the drive unit. This structure can be employed to easily form the drive-unit grasping means. Further, the drive-unit grasping means can easily be detached.

According to the present invention, preferably, the leading end is formed to be detachable. This structure can be employed to stably disassemble various types of washing machines. Further, in such a case where the leading end is broken and the leading end has to be replaced, the leading end can easily be replaced.

According to the present invention, preferably, the drive-unit grasping means includes a hook drive unit for pressing the open/close hook in the direction of closing the open/close hook, and the hook drive unit is formed to contact the open/close hook without being connected and secured to the open/close hook. This structure can be employed to close the open/close hook with a constant force and remote control can be made to improve workability. Further, even when force is applied to the open/close hook in various directions, the hook drive unit can be prevented from being broken.

According to the present invention, preferably, the separating means is formed to apply the force of at least 670 kg and at most 940 kg. This structure can be employed to disassemble most of washing machines and prevent the separating means from increasing in size to a degree that is more than necessary or increasing in cost.

According to the present invention, preferably, the apparatus includes a shatterproof plate formed to surround the separating means. This structure can be employed to prevent an operator therearound from being damaged when components for example of the washing machine scatter unexpectedly or prevent surrounding machines from being broken.

A recycled resin according to the present invention is recovered using the above-described washing-machine disassembling apparatus. This structure can be employed to provide a recycled resin of high quality.

A resin product according to the present invention is formed using the above-described recycled resin. This structure can be employed to provide a resin product of high quality.

BEST MODES FOR CARRYING OUT THE INVENTION

Figure 21:
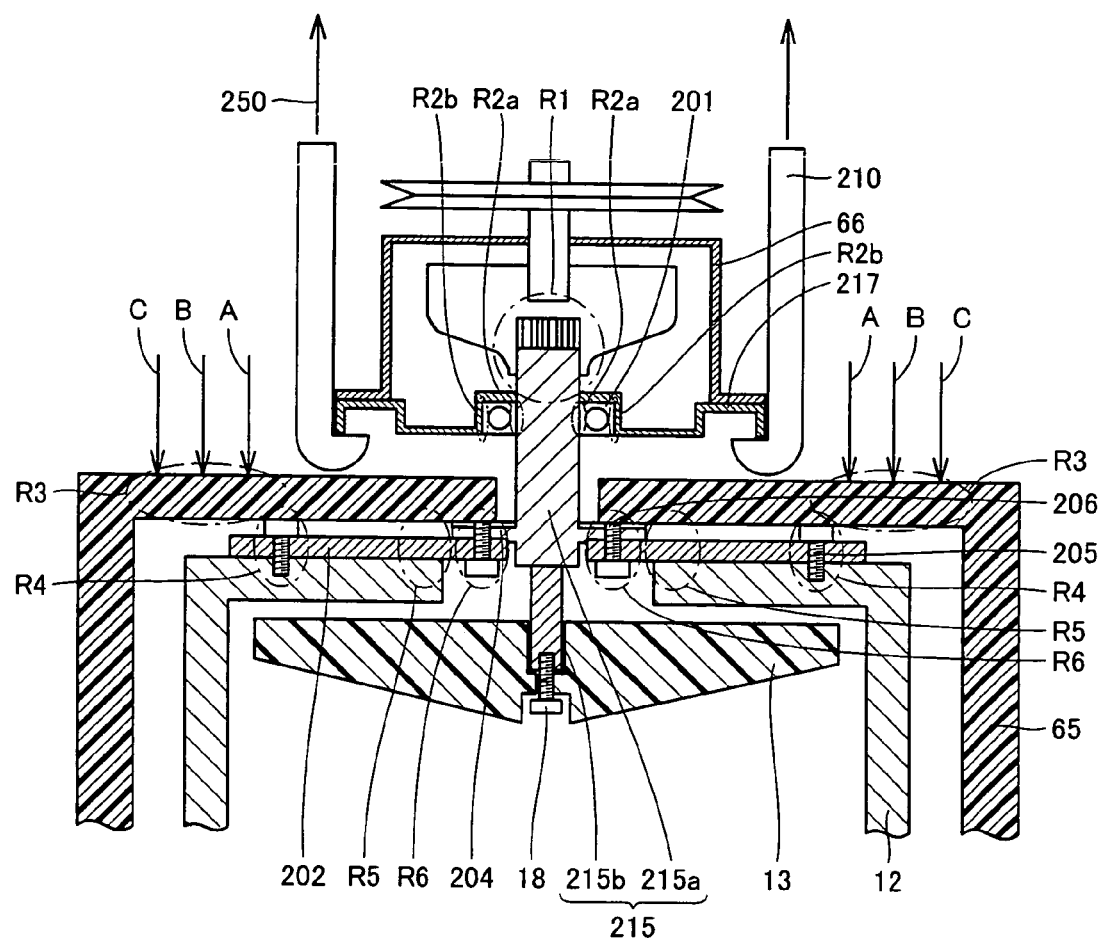
FIG. 21 is a cross-sectional view of a washing machine when disassembled that has a dehydration-tub flange made of sheet steel.
Figure 22:
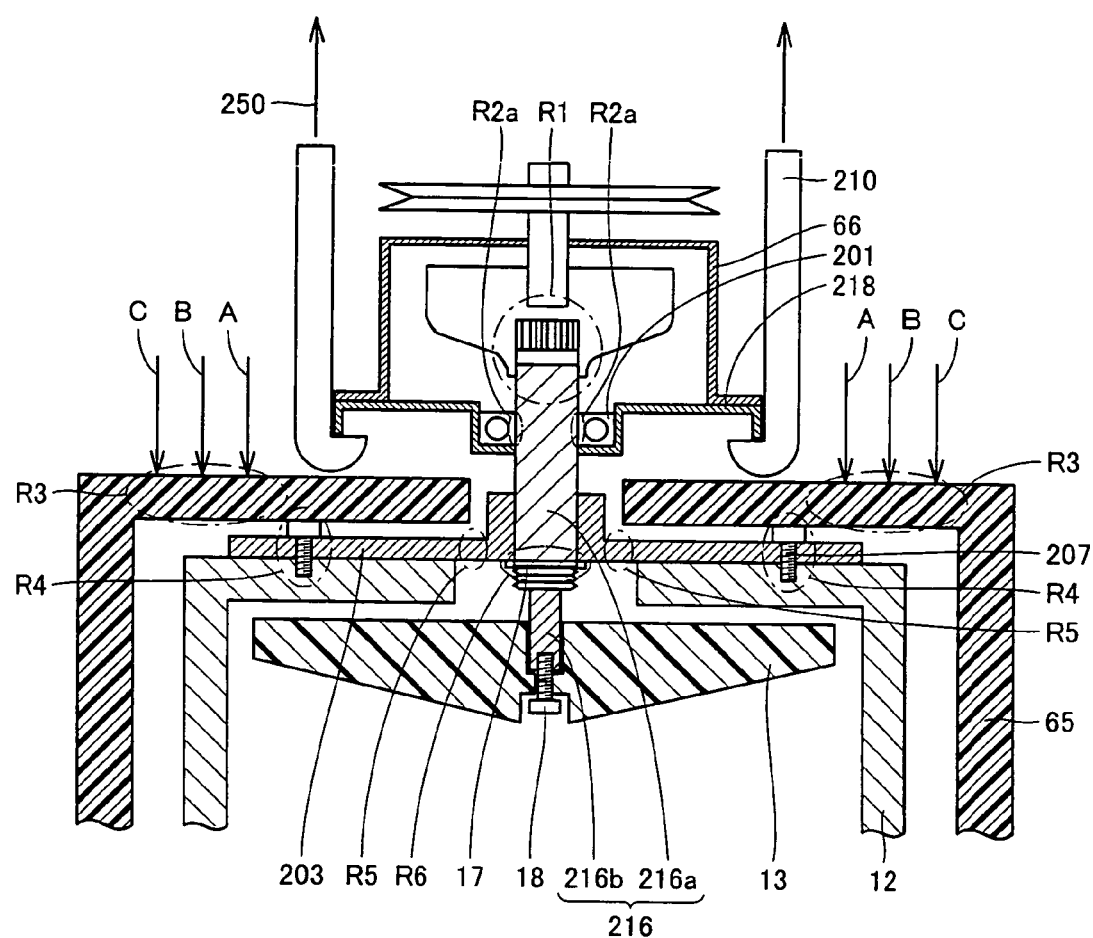
FIG. 22 is a cross-sectional view of a washing machine when disassembled that has a dehydration-tub flange made of aluminum.
Figure 23:
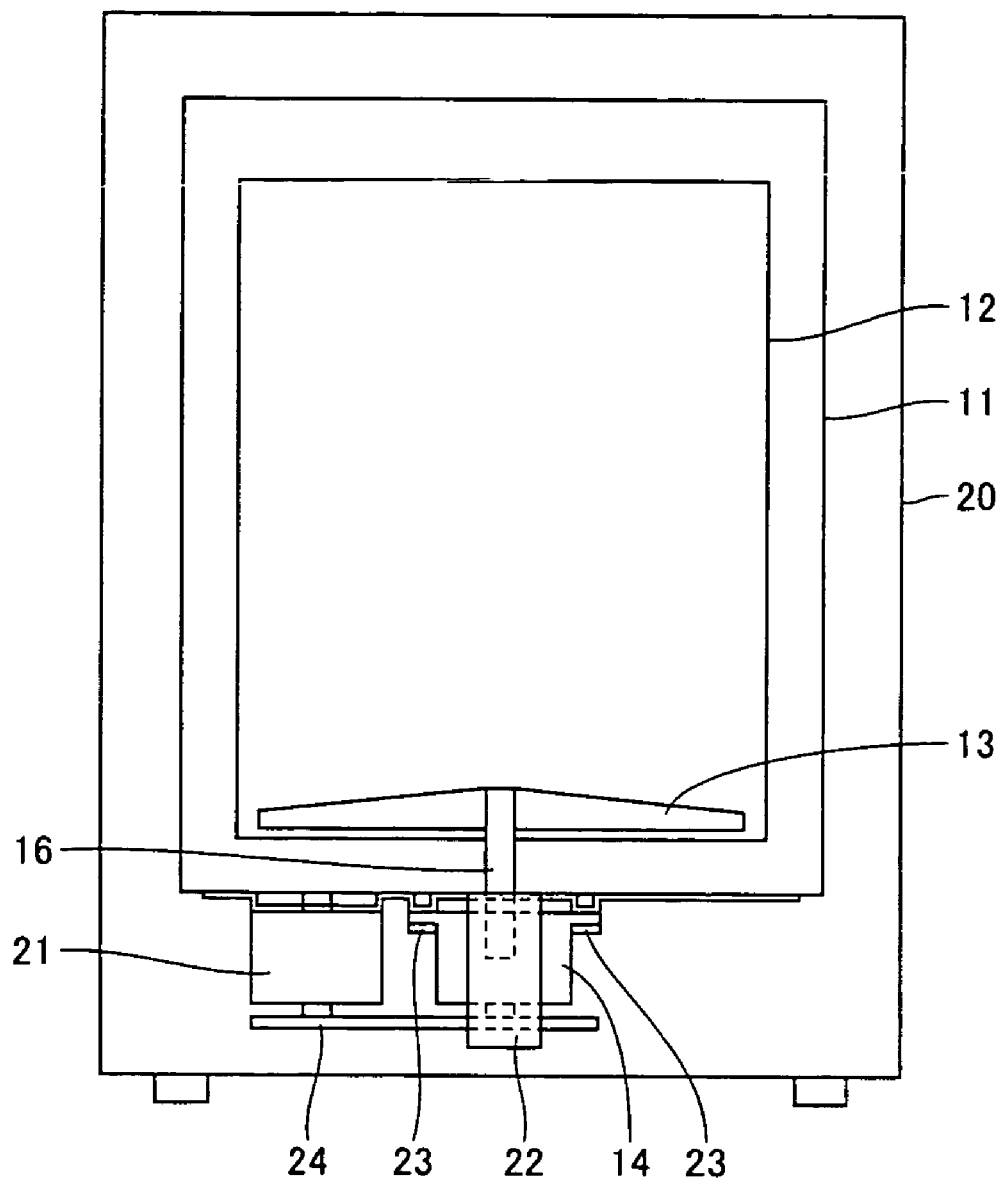
FIG. 23 is a schematic cross-sectional view of a washing machine.
Figure 24:
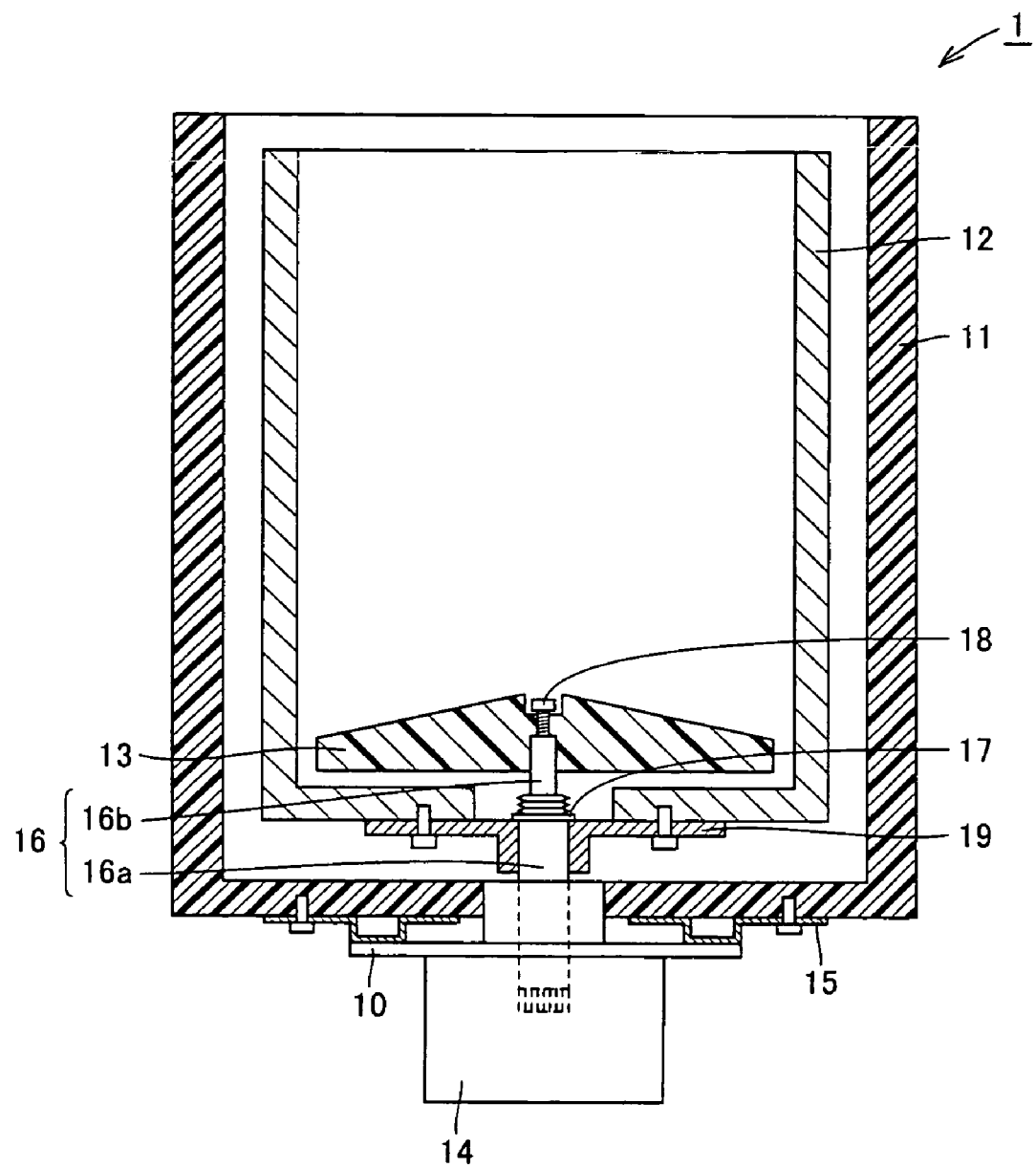
FIG. 24 is a partially-enlarged cross-sectional view of a water-tub unit of a washing machine.

Referring first to FIGS. 21 and 22, a description is given of characteristics of disassembly depending on the structure of a washing machine, when the washing machine studied by the applicant of the present application is disassembled.

FIG. 21 is a cross-sectional view of a washing machine when disassembled that has a dehydration-tub flange made of sheet steel, and FIG. 22 is a cross-sectional view of a washing machine when disassembled that has a dehydration-tub flange made of aluminum. The washing machines shown respectively in FIG. 21 and FIG. 22 each have a dehydration tub 12 disposed inside a water tub 65, and a drive unit comprised of a reduction-gear unit 66 and a reduction-gear frame 217, 218 is disposed on the outside of water tub 65. Dehydration tub 12 and reduction-gear unit 66 are connected through a rotary shaft 215, 216.

In order to achieve 100% recovery of the water tub from the unit to be disassembled including the water tub, the rotary shaft and the drive unit without damage to the water tub, any of couplings between the dehydration tub and the rotary shaft, and between the drive unit and the rotary shaft may be released.

The applicant conceived a coupling-releasing method. Specifically, from the dehydration tub, the drive unit is separated in the axial direction of the rotary shaft or, from the drive unit, the dehydration tub is separated in the axial direction of the rotary shaft. Of these methods, the applicant examined the method of separating the dehydration tub and the drive unit from each other by lifting the drive unit while pressing the bottom of the water tub, in order to find what phenomenon would occur to the unit to be disassembled in the disassembly process.

Currently, washing machines delivered to recycling plants for household electrical appliance are classified roughly into those whose dehydration-tub flange is made of sheet steel and those whose dehydration-tub flange is made of aluminum. A comparison of the structure between these two types shows that they are different in structure for attaching the dehydration tub to the rotary shaft and in structure for attaching bearings.

FIG. 21 shows a structure of a typical washing machine having its dehydration-tub flange made of sheet steel. This washing machine has rotary shaft 215 including a dehydration-tub rotary shaft 215a and a pulsator rotary shaft 215b, and a dehydration-tub flange 202 of sheet steel is secured to dehydration-tub rotary shaft 215a. On a side surface of rotary shaft 215, a screw-fastening flange 204 is formed. Dehydration-tub flange 202 is secured with a bolt 206 to screw-fastening flange 204. Dehydration-tub flange 202 is secured with a bolt 205 to a dehydration tub 12. A bearing 201 is press-fitted from the outside of a reduction-gear frame 217.

FIG. 22 shows a structure of a typical washing machine having its dehydration-tub flange made of aluminum. This washing machine has rotary shaft 216 including a dehydration-tub rotary shaft 216*a* and a pulsator rotary shaft 216*b*. To dehydration-tub rotary shaft 216*a*, dehydration-tub flange 203 of aluminum is secured. Dehydration-tub flange 203 is fitted on a D-cut portion formed in rotary shaft 216 and secured with a dehydration-tub securing nut 17. Dehydration-tub flange 203 is secured with a bolt 207 to dehydration tub 12. A bearing 201 is press-fit from the inside of a reduction-gear frame 218.

In FIGS. 21 and 22, a drive unit including reduction-gear unit 66 and reduction-gear frame 217, 218 is caught by a hook 210 to lift the drive unit from water tub 65 in the axial direction of rotary shaft 215, 216. While the drive unit is lifted in the direction of arrow 250, the bottom of water tub 65 is pressed in the opposite direction to the direction of arrow 250 for preventing the water tub from moving.

Thus, the drive unit is caught by the hook and the hook is lifted while the water tub is held fast, so that an internal stress occurs in each of regions R1 to R6 located in the region from the drive unit to the bottom of the dehydration tub. If the hook is lifted with a stronger force, the most brittle region among these regions is broken.

With reference to FIG. 21, in the case where the dehydration-tub flange of the washing machine is made of sheet steel, the order of strength of the regions where the internal stress occurs is generally represented by the following formula (1):

$$R3 < R1, R2a, R2b < R4 << R6 < R5 \quad (1).$$

When the regions are each broken due to the stress occurring in the region, the state of separation is the one as shown in Table 1. In terms of achievement of a certain recovery ratio of the water tub and reduction in working load, it is preferable that separation is accomplished by pressing the position indicated by arrow A or B for avoiding breakage of region R3. In most of cases in which this separation is accomplished in this way, broken regions are region R1 and region R2*a*, or region R1 and region R2*b*. Region R5 or R6 is rarely broken.

TABLE 1

| region | Region where internal stress occurs and state of separation (dehydration-tub flange is made of sheet steel) state of separation when force is continuously applied to cause the corresponding region to break |
|---|---|
| R1, R2a, R2b | When the coupling force between the rotary shaft and the internal surface of the bearing (coupling force in region R2a) is weaker than the coupling force between the reduction-gear frame and the external surface of the bearing (coupling force in region R2b), the rotary shaft comes off from the bearing and the reduction-gear frame and the water tub can easily be separated. When the coupling force between rotary shaft and the internal surface of the bearing (coupling force in region R2a) is stronger than the coupling force between the reduction-gear frame and the external surface of the bearing (coupling force in region R2b), the rotary shaft comes off from the reduction-gear unit while the bearing is fit on the rotary shaft. In order to separate the water tub, work for detaching the bearing from the rotary shaft is necessary. |
| R3 | The bottom of the water tub splits and the dehydration tub, dehydration-tub flange, rotary shaft and reduction-gear unit are collectively and simultaneously pulled out from the water tub. In some cases, a part of the bottom of the water tub is caught in the reduction-gear unit and torn away from the body of the water tub. As a result, the amount of resin recovered from the water tub considerably decreases or additional work for separating the broken part of the water tub is necessary. |
| R4 | Screws fastening the dehydration-tub flange and the dehydration tub do not break themselves. In some cases, however, the screws are pulled out from the bottom of the dehydration tub. When lifting of the drive unit is continued, usually the bottom (region R3) of the water tub is broken and the reduction-gear unit, rotary shaft and dehydration-tub flange are collectively and simultaneously separated from the water tub. |
| R5 | Shearing force is exerted on the dehydration-tub flange to divide the dehydration-tub flange. As a result, while a part of the dehydration-tub flange is joined to the rotary shaft, the rotary shaft and the reduction-gear unit fitting each other are separated from the water tub. Since the dehydration-tub flange is rigid, there is an extremely low possibility of breakage of region R5. |
| R6 | Screws fastening the dehydration-tub flange and the rotary shaft are broken to separate the dehydration-tub flange from the rotary shaft. The rotary shaft and the reduction-gear unit fitting each other are separated from the water tub. Since the screws are rigid, there is an extremely low possibility of breakage of region R6. |

With reference to FIG. 22, in the case where the dehydration-tub flange of the washing machine is made of aluminum, the order of strength of the regions where the internal stress occurs is generally represented by the following formula (2):

$$R3 < R1, R2a, R5 < R4 << R6 \quad (2).$$

When the regions are each broken due to the stress occurring in the region, the state of separation is the one as shown in Table 2. As the flange made of sheet steel, in most of cases in which this separation is accomplished in such a way to avoid breakage of region R3, broken regions are region R1 and region R2*a*, or region R5. Region R6 is rarely broken.

TABLE 2

| region | Region where internal stress occurs and state of separation (dehydration-tub flange is made of aluminum) state of separation when force is continuously applied to cause the corresponding region to break |
|---|---|
| R1, R2a, R5 | When the stress concentration region (region R5) of the dehydration-tub flange is stronger than both of the coupling force between the rotary shaft and the reduction-gear unit (coupling force in region R1) and the coupling force between the rotary shaft and the internal surface of the bearing (coupling force in region R2a), region R1 and region R2a are broken. In contrast, when the stress concentration region (region R5) of the dehydration-tub flange is weaker than one of or both of the coupling force between the rotary shaft and the reduction-gear unit (coupling force in region R1) and the coupling force between the rotary shaft and the internal surface of the bearing (coupling force in region R2a), region R5 is broken. When region R1 and region R2a are broken, the rotary shaft comes off from the bearing and the reduction-gear frame and the water tub can easily be separated. When region R5 is broken, the dehydration-tub flange is divided near the rotary shaft, the rotary shaft fitting the reduction-gear unit is pulled out and the water tub can easily be separated. |

TABLE 2-continued

Region where internal stress occurs and state of separation
(dehydration-tub flange is made of aluminum)

| region | state of separation when force is continuously applied to cause the corresponding region to break |
|---|---|
| R3 | The bottom of the water tub splits and the dehydration tub, dehydration-tub flange, rotary shaft and reduction-gear unit are collectively and simultaneously pulled out from the water tub. In some cases, a part of the bottom of the water tub is torn away from the body of the water tub. As a result, the amount of resin recovered from the water tub considerably decreases or additional work for separating the broken part of the water tub is necessary. |
| R4 | Screws fastening the dehydration-tub flange and the dehydration tub do not break themselves. In some cases, however, the screws are pulled out from the bottom of the dehydration tub. When lifting of the drive unit is continued, usually the bottom (region R3) of the water tub is broken and the reduction-gear unit, rotary shaft and dehydration-tub flange are collectively and simultaneously separated from the water tub. Depending on the state of separation, the stress concentration region (region R5) of the dehydration-tub flange is broken, the rotary shaft fitting the reduction-gear unit is pulled out and the water tub can easily be separated. |
| R6 | Screws fastening the dehydration-tub flange and the rotary shaft are broken and the dehydration-tub flange and the rotary shaft are separated from each other. The rotary shaft and the reduction-gear unit fitting each other are separated from the water tub. Since the screws are rigid, there is an extremely low possibility of breakage of region R6. |

In view of Table 1 and Table 2, it is preferable, for increasing the amount of resin recovered from the water tub or facilitating the work, to cause region R1 and region R2a to be broken. Further, when the dehydration-tub flange is made of aluminum, region R5 may be caused to be broken to achieve similar effects to those obtained when the above-described two regions are broken.

Regarding the position at which the bottom of the water tub is pressed, it is preferable that any position is pressed to cause region R1 and region R2a to be broken or cause region R5 to be broken (here, region R5 is preferably broken only when the dehydration-tub flange is made of aluminum).

As shown in FIGS. 21 and 22, when the position at which the water tub is pressed is changed as indicated by arrows A to C, internal stress occurs in regions shown in Table 3 and some regions are broken as shown in Table 3.

TABLE 3

Relation between pressed position of
water tub and main broken region

| position at which water tub is pressed | region where internal stress occurs | main broken region |
|---|---|---|
| Arrow A (position opposite to dehydration-tub flange) | Region R1, Region R2a (if the bearing is press-fit from the outside of the drive unit, Regions R2a and R2b), Region R5, Region R6 | Region R1, Region R2a (if the bearing is press-fit from the outside of the drive unit, Region R2a or R2b), or Region R5 if the dehydration-tub flange is made of aluminum |
| Arrow B (position opposite to the bottom of dehydration tub but not opposite to dehydration-tub flange) | Region R1, Region R2a (if the bearing is press-fit from the outside of the drive unit, Region R2a and Region R2b), Region R4, Region R5, Region R6 | Region R1, Region R2a (if the bearing is press-fit from the outside of the drive unit, Region R2a or R2b), Region R4 or Region R5 if the dehydration-tub flange is made of aluminum |
| Arrow C (position that is not opposite to the bottom of dehydration tub) | Region R1, Region R2a (if the bearing is press-fit from the outside of the drive unit, Regions R2a and R2b), Region R3, Region R4, Region R5, Region R6 | Region R3 |

From Table 3, it can be determined that the most effective method for avoiding region R3 or region R4 (resulting in breakage of region R3) from being broken is to press the bottom of the water tub at the position indicated by arrow A. In other words, it is preferable that the water tub is pressed at the position opposite to the bottom surface of the dehydration-tub flange.

Although the description above is applied to the structure of the dehydration-tub flange of aluminum having the bearing that is press-fit from the inside of the reduction-gear frame, some flanges of aluminum have the bearing that is press-fit from the outside of the reduction-gear frame and some flanges of sheet steel has the bearing that is press-fit from the inside of the reduction-gear frame.

If the bearing is press-fit from the outside of the reduction-gear frame, both of region R2a and region R2b may be taken into consideration. If the bearing is press-fit from the inside of the reduction-gear frame, only region R2a may be taken into consideration. Regardless of the material of which the dehydration flange is made, internal stress occurs in the same region of the portion where the bearing and the reduction-gear frame are coupled.

In addition, although it is described above as an example that the bearing is press-fit in the reduction-gear frame, the bearing is not limited to the form described. The bearing is generally press-fit in the drive unit, namely the reduction-gear unit or reduction-gear frame.

Based on the results discussed above, the applicant has been conducted studies of a disassembling apparatus that can pull out the rotary shaft from the drive unit without breaking the water tub. Considering regions or portions where internal stress occurs in the disassembly process depending on the structure of the unit to be disassembled, the applicant has found a disassembling apparatus that is suitable for separating and recovering the water tub. Embodiments are hereinafter described in detail.

First Embodiment

With reference to FIGS. 1A to 9, a description is given below of a method and an apparatus for disassembling a washing machine according to a first embodiment of the present invention.

The washing machine has its structure similar to the one described herein in connection with the background art. Specifically, the washing machine has a housing in which a water tub is formed and a dehydration tub is further formed in the water tub. The dehydration tub is connected through a rotary shaft to the water tub. To the water tub, a reduction-gear unit and a motor are secured. In the process of disassembling the washing machine, the step of firstly removing a water-tub unit from the housing is the same as that of the conventional disassembling method.

Figure 1A:
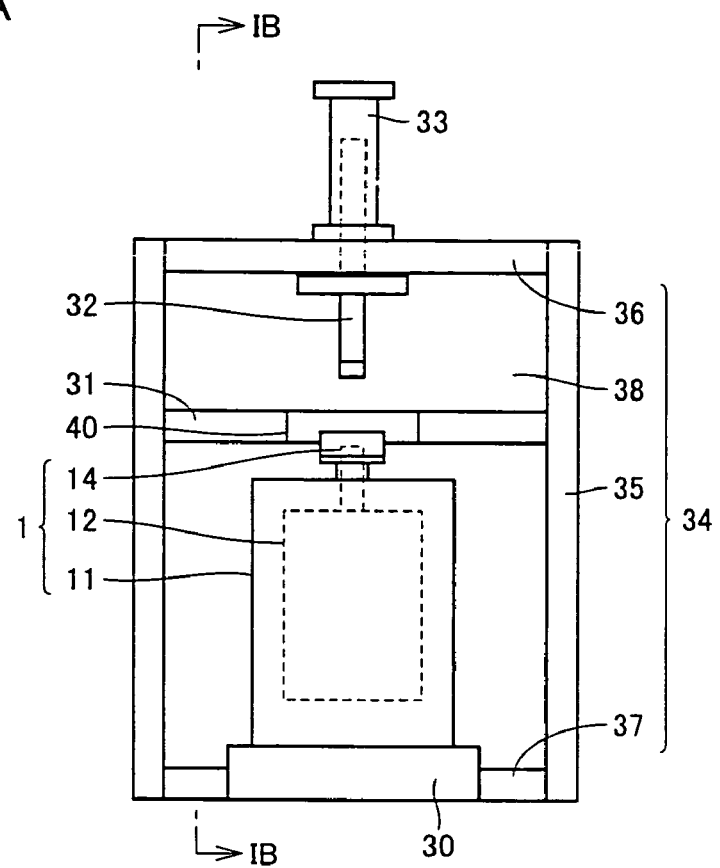
FIG. 1A is a front view of a disassembling apparatus for a washing machine according to an embodiment of the present invention.
Figure 1B:
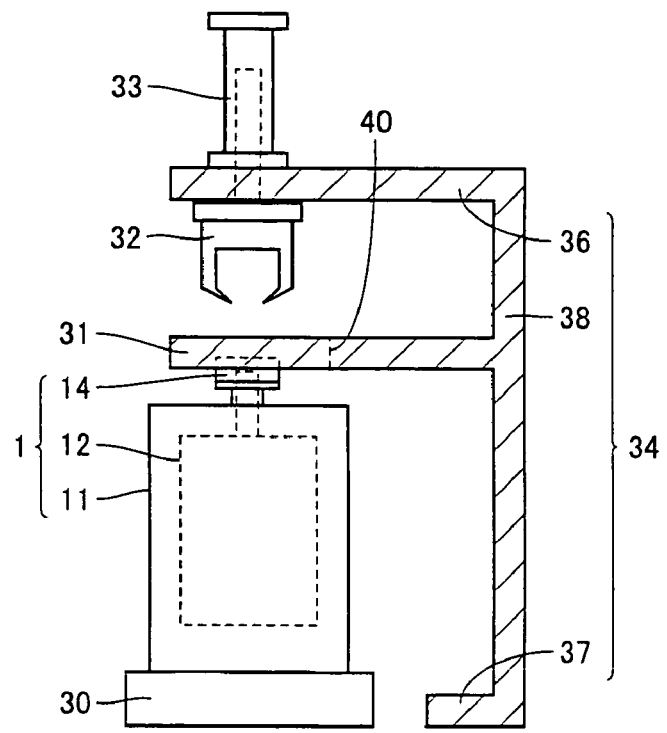
FIG. 1B is a cross-sectional view along line IB-IB in FIG. 1A as seen in the direction indicated by an arrow.

FIGS. 1A and 1B each show a schematic of a disassembling apparatus for a washing machine according to the present invention. FIG. 1A is a front view of the disassembling apparatus and FIG. 1B is a cross-sectional view along line IB-IB in FIG. 1A as seen in the direction of the arrows. The disassembling apparatus includes a frame 34 for supporting the components each. Frame 34 serving as a main frame includes a side plate 35 and a back plate 38. At the top of frame 34, a ceiling plate 36 is disposed. At the bottom of frame 34, a bottom plate 37 is disposed. At ceiling plate 36, a hydraulic cylinder 33 serving as moving means is disposed. Hydraulic cylinder 33 is coupled to a shaft of an open/close hook 32 serving as holding means. Open/close hook 32 is formed to be movable up and down by being driven by hydraulic cylinder 33. Open/close hook 32 has an open/close drive mechanism (not shown) that allows open/close hook 32 to open/close. In the present embodiment, open/close hook 32 is formed of two claws. However, more claws may be formed.

At substantially central portion in the longitudinal direction of side plate 35, a press plate 31 is formed that serves as movement inhibiting means secured to frame 34. Press plate 31 is disposed to allow its main surface to be horizontal. Press plate 31 has a notch 40 formed therein. Notch 40 is formed so that open/close hook 32 can pass through the inside of notch 40. Further, press plate 31 is formed at the position contacting the bottom of water tub 11 when the water-tub unit is moved up and down. Below press plate 31, a plate-shaped table 30 is formed for mounting water-tub unit 1 thereon.

Water-tub unit 1 is disposed on table 30 in the state where the side having reduction-gear unit 14 formed thereon, which is originally the lower side of the washing machine, faces upward. At this time, the position of water-tub unit 1 is adjusted to allow open/close hook 32 to be located directly above reduction-gear unit 14. Table 30 is preferably placed at an appropriate height that does not burden an operator in charge as reduction-gear unit 14 is held by open/close hook 32. Alternatively, table 30 is preferably an elevating table with its height adjustable according to the size of the washing machine.

Figure 2:
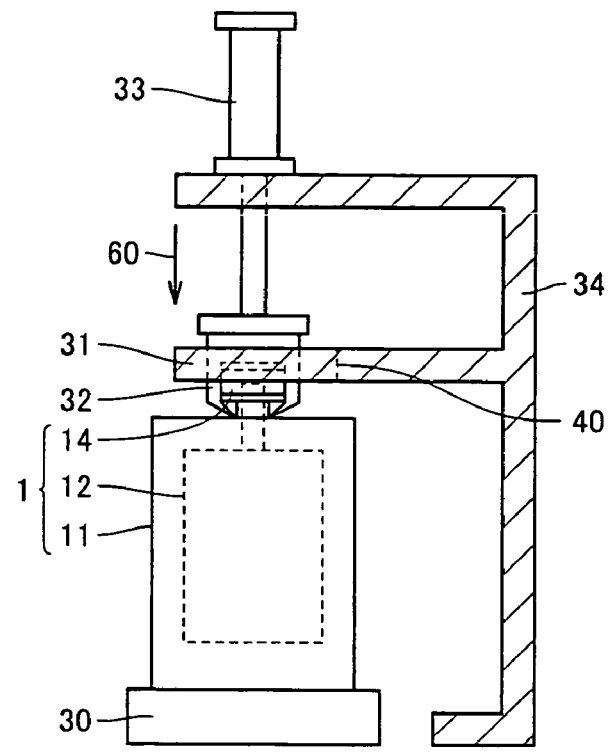
FIG. 2 illustrates a first step of the disassembling method for a washing machine according to the present invention.

As shown in FIG. 2, in the state where open/close hook 32 is opened, hydraulic cylinder 33 is driven to move open/close hook 32 downward as indicated by arrow 60. After this, open/close hook 32 is closed to catch reduction-gear unit 14 with open/close hook 32. As open/close hook 32 moves downward, open/close hook 32 passes the inside of notch 40 of press plate 31.

Figure 3:
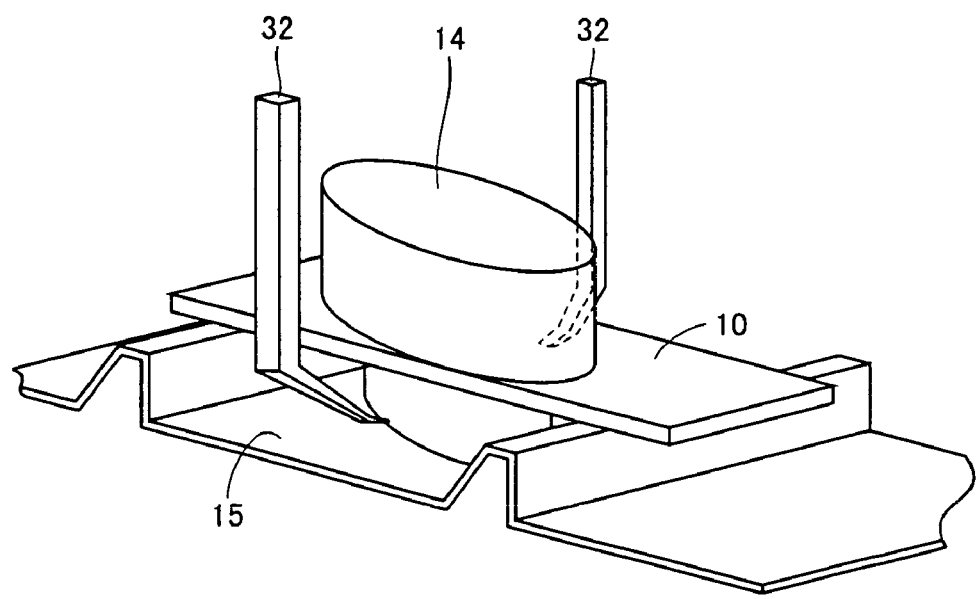
FIG. 3 is a first illustration of the state of holding a reduction-gear unit with an open/close hook.
Figure 4:
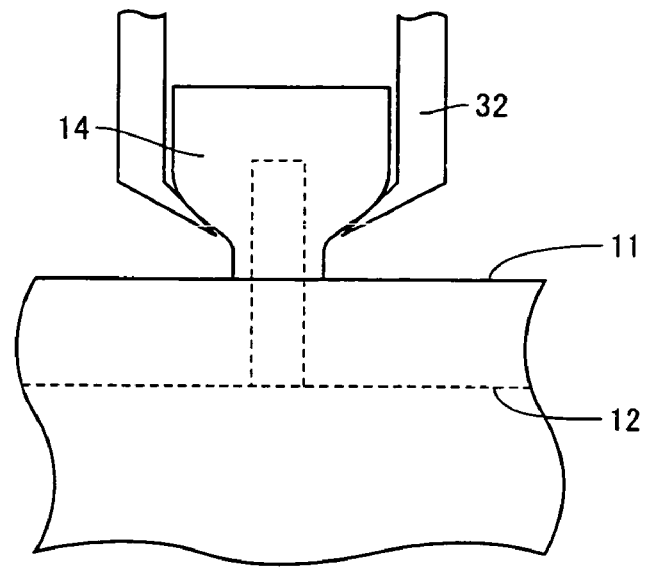
FIG. 4 is a second illustration of the state of holding the reduction-gear unit with the open/close hook.

FIG. 3 is an enlarged perspective view showing open/close hook 32 catching reduction-gear unit 14 therein. At reduction-gear unit 14, a plate portion 10 is formed. In the gap between plate portion 10 and reduction-gear frame 15, respective leading-ends of the claws of open/close hook 32 are inserted. Plate portion 10 of reduction-gear unit 14 is thus caught and held by open/close hook 32. Some washing machines have reduction-gear unit 14 whose bottom has a mountain-shaped cross section. In this case, as shown in FIG. 4, the periphery of the mountain-shape of reduction-gear unit 14 may directly be held by open/close hook 32. Thus, the open/close hook serving as holding means can be included to hold the reduction-gear unit with the simple structure. Moreover, the disassembling apparatus can be used for reduction-gear units of various sizes and types.

Figure 5:
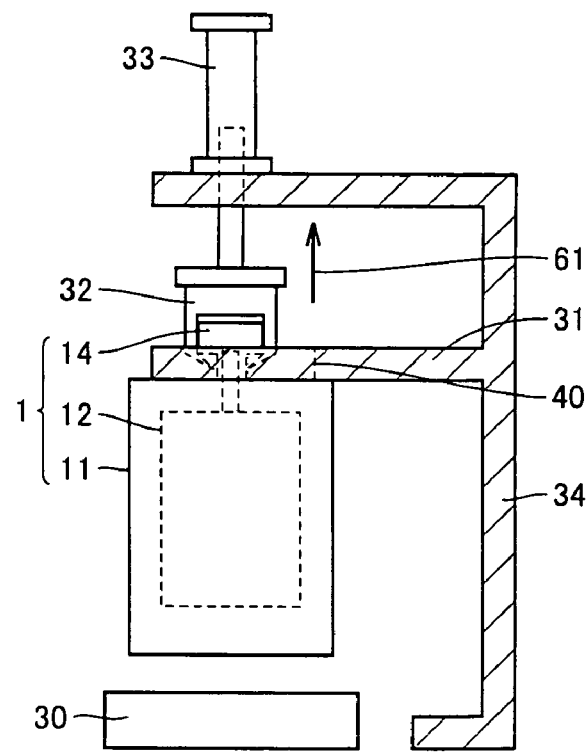
FIG. 5 illustrates a second step of the disassembling method for a washing machine according to the present invention.

Then, as shown in FIG. 5, hydraulic cylinder 33 is driven to lift open/close hook 32 upward as indicated by arrow 61. Simultaneously with the lifting of reduction-gear unit 14 by means of open/close hook 32, water tub 11 and dehydration unit 12 are also lifted in the direction indicated by arrow 61. Open/close hook 32 holding reduction-gear unit 14 therein passes through the inside of notch 40 of press plate 31. When lifted to a certain degree, the bottom of water tub 11 contacts press plate 31. Since press plate 31 is secured to frame 34; the upward movement of water tub 11 is stopped. Press plate 31 serves to inhibit movement of water tub 11.

Figure 6:
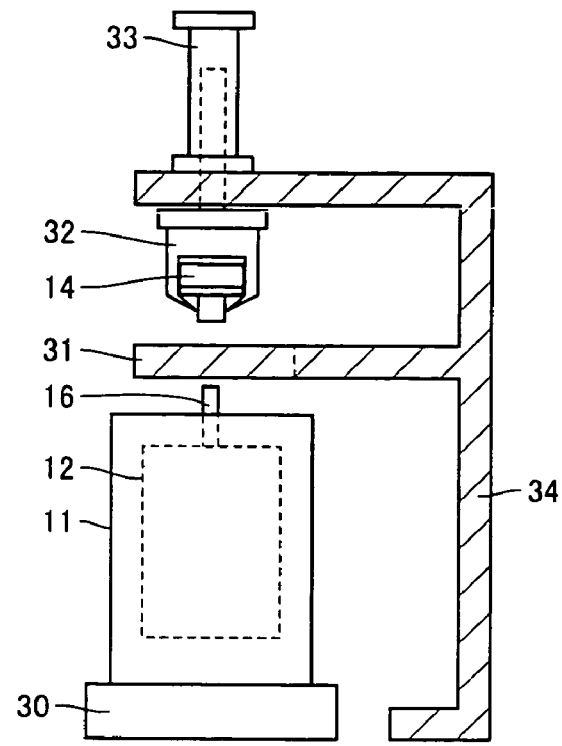
FIG. 6 illustrates a third step of the disassembling method for a washing machine according to the present invention.

As shown in FIG. 6, in the state where the movement of water tub 11 is stopped, reduction-gear unit 14 is continuously lifted upward to completely separate reduction-gear unit 14 and water tub 11 from each other. Reduction-gear unit 14 is still held by open/close hook 32. The separated water tub 11 falls on the upper side of table 30.

Figure 7:
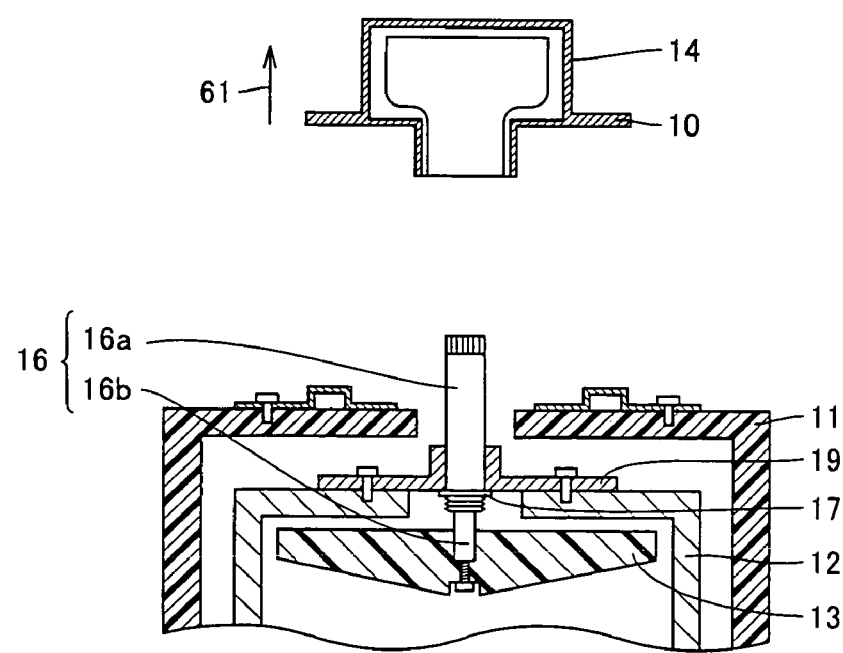
FIG. 7 is a first illustration of the state of separating the reduction-gear unit from a water tub.
Figure 8:
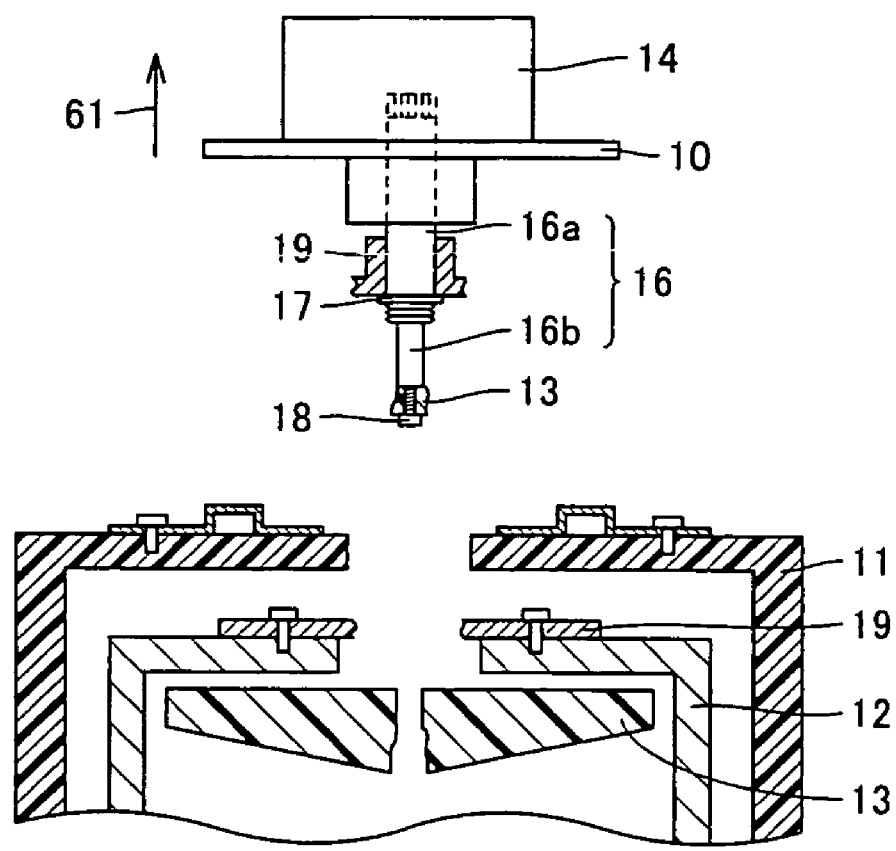
FIG. 8 is a second illustration of the state of separating the reduction-gear unit from the water tub.

FIG. 7 is an enlarged cross-sectional view of reduction-gear unit 14 and water tub 11 that are separated from each other. A dehydration-tub rotary shaft 16a and a dehydration-tub flange 19 are connected. A pulsator 13 is secured to a pulsator rotary shaft 16b. Dehydration-tub rotary shaft 16a and a reduction gear within reduction-gear unit 14 are decoupled so that reduction-gear unit 14 can be pulled out from dehydration-tub rotary shaft 16a. Thus, by means of the force of the hydraulic cylinder, the coupling portion between the reduction-gear unit and the rotary shaft is broken so that only reduction-gear unit 14 can be separated from water tub 11.

Separated rotary shaft 16 can easily be pulled out from water tub 11 together with dehydration tub 12. After this, metal fittings and hoses disposed at water tub 11 are detached to separate the water tub only. Consequently, plastic used for water tub 11 can be recovered at a recovery ratio of 100%.

In the step of pulling off the reduction-gear unit, there is the case where the reduction-gear unit and the rotary shaft are firmly coupled to each other due to corrosion or the like of parts, or where the axial direction of rotary shaft 16 and the direction of pulling of open/close hook 32 do not accurately match. Namely the direction of pulling is not appropriate. Even if such factors as described above do not allow dehydration-tub rotary shaft 16a to be pulled off from reduction-gear unit 14, dehydration-tub flange 19 that couples dehydration-tub rotary shaft 16a and dehydration tub 12 to each other is divided so that reduction-gear unit 14 to which rotary shaft 16 is attached can be detached from water tub 11. As for the coupling between pulsator 13 and rotary shaft 16, the coupling portion of pulsator 13 may be divided or a pulsator-securing screw 18 may be broken to break the coupling portion. Alternatively, pulsator rotary shaft 16b may be pulled out from dehydration-tub rotary shaft 16a and left on the dehydration tub together with pulsator 13. In any of the cases, plastic used for water tub 1I can be recovered at a recovery ratio of 100%.

Thus, the gear-unit pulling-off step of separating the reduction-gear unit from the water tub is included and the step of pulling out the reduction-gear unit from the dehydration-tub rotary shaft is included to easily separate the water tub and the dehydration tub from each other. Consequently, the time for disassembling the washing machine is considerably reduced and the burden on the operator can remarkably be reduced. In addition, since the water tub can be removed substantially in the original state, plastic used for producing the water tub can be recovered at a high recovery ratio. In the gear-unit pulling-off step, the dehydration-tub flange for allowing the dehydration-tub rotary shaft to pass through the dehydration tub can be divided to achieve similar effects.

The disassembling apparatus of the washing machine includes holding means for holding the reduction-gear unit, moving means for moving the holding means, and movement-inhibiting means for inhibiting movement of the water tub so that the reduction gear can easily be separated from the water tub and the water tub and the dehydration tub can easily be separated from each other. Further, the material for the water tub can be recovered at a high recovery ratio. Furthermore, the hydraulic cylinder can be used as the moving means to easily form the moving means having a sufficient pulling force. Moreover, since the press plate protruding from the frame can be formed to easily form the movement-inhibiting means.

Figure 9:
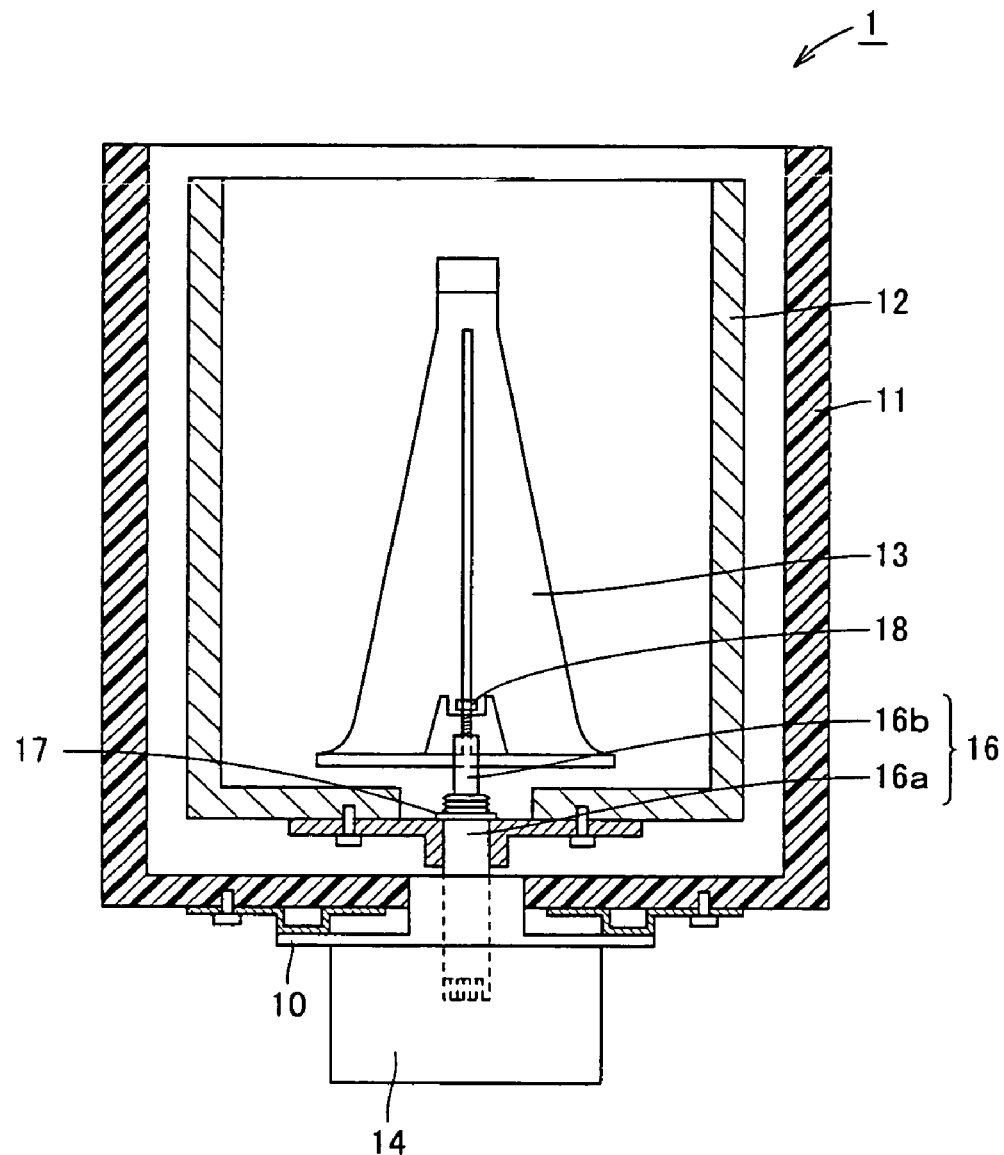
FIG. 9 is a partial cross-sectional view showing a structure of a washing machine having a pulsator in the shape of protrusion.

In the present embodiment, the pulsator is planer in shape. In contrast, some washing machines have a pulsator 13 as shown in FIG. 9 with the shape of protrusion. This pulsator 13 is shaped to be longer in dimension in the direction of the rotational axis than in outer diameter at the bottom. The pulsator has a boss at the bottom formed on the rotational axis that is fit on the rotary shaft and the pulsator is secured from the outside using a pulsator securing screw to the pulsator rotary shaft. Some pulsators having the shape of protrusion as shown in FIG. 9 are large for example having an inner diameter of approximately φ50 mm and a height of approximately 450 mm. Therefore, no light reaches pulsator-securing screw 18 and, when such a tool as driver is put in, pulsator-securing screw 18 is shaded by the tool, which makes it considerably difficult to detach. Further, pulsator-securing screw 18 is often covered with detergent residues. In this case, it often occurs that the shape of pulsator-securing screw 18 cannot be identified. The present invention can remarkably shorten the working time than the one for any washing machines having a planer pulsator and thus the present invention is particularly effective for washing machines whose pulsator is in such a shape as protrusion.

In the present embodiment, the open/close hook is employed as holding means. However, the holding means is only required to hold the reduction-gear unit. For example, instead of the open/close hook, a hydraulic clamp may be formed to form a holding unit catching the reduction-gear unit therein. As the moving means, instead of the hydraulic cylinder, such a moving unit as motor or air cylinder may be formed. In addition, the moving-inhibiting means is not limited to the press plate. The moving-inhibiting means is only required to stop movement of the water tub when the reduction-gear unit is pulled by the holding means. For example, on both sides of the reduction-gear unit as seen from the upper side, rod-shaped moving-inhibiting means independent of the frame may be formed.

Second Embodiment

Referring to FIGS. 10 to 20, a description is given below of a method of disassembling a washing machine, an apparatus for disassembling a washing machine, a recycled resin and a resin product, according to a second embodiment of the present invention.

Figure 10:
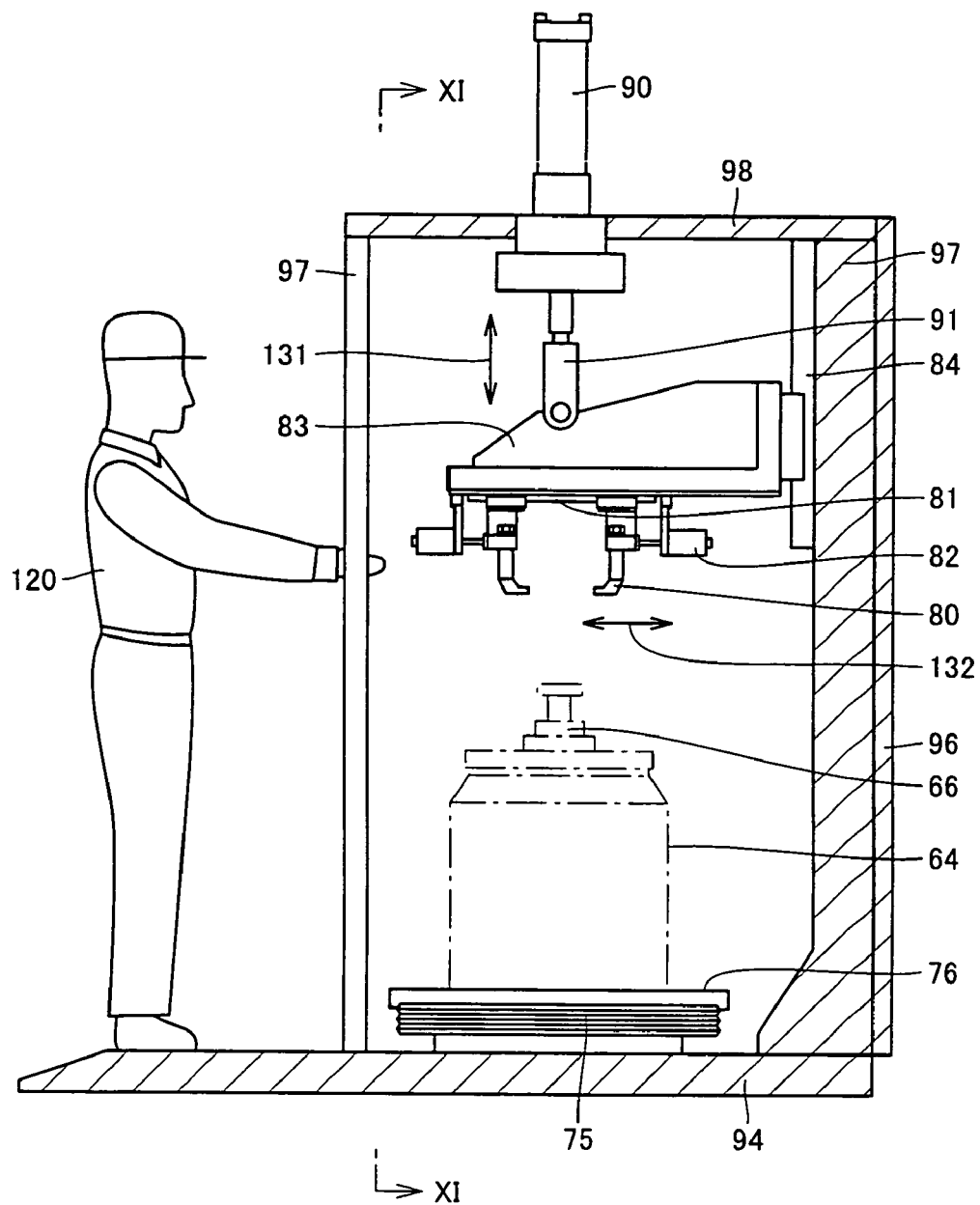
FIG. 10 is a partial cross-sectional view of a disassembling apparatus in a second embodiment as seen from a side.

FIG. 10 is a partial cross-sectional view as seen from a side of a disassembling apparatus for a washing machine in the present embodiment. The disassembling apparatus includes a rod-shaped frame 97 on a surface of a bottom plate 94 and a plate-shaped top plate 98 formed on the top of frame 97. Components of the disassembling apparatus are each attached to bottom plate 94, frame 97 or top plate 98. At frame 97 located on the side opposite to the side where an operator 120 works, a plate-shaped back plate 96 is formed.

To top plate 98 of the upper portion, a hydraulic cylinder 90 serving as moving means for moving up and down an open/close hook 80 serving as drive-unit grasping means is secured. Hydraulic cylinder 90 is formed to allow the direction of movement of open/close hook 80 to be in parallel with the vertical direction. Hydraulic cylinder 90 in the present embodiment is formed to be able to lift open/close hook 80 at the speed of at least 45 mm/sec and at most 50 mm/sec. Further, hydraulic cylinder 90 is formed to be able to drive in the range of at least 670 kg and at most 940 kg.

Hydraulic cylinder 90 includes a shaft 91. Shaft 91 is coupled to a hook-supporting member 83. Hook-supporting member 83 holds open/close hook 80. Hook-supporting member 83 is used to transmit the up-and-down movement of shaft 91 caused by hydraulic cylinder 90 to open/close hook 80.

Hook-supporting member 83 is formed toward the rear side of the disassembling apparatus that is opposite to the side where operator 120 stands. To frame 97 and top plate 98 on the rear side of the disassembling apparatus, a hook-supporting-member rail 84 is secured. Hook-supporting-member rail 84 is formed to have its longitudinal direction in parallel with the vertical direction. Hook-supporting member 83 is formed to fit in hook-supporting-member rail 84 and be able to move in the vertical direction along the longitudinal direction of hook-supporting-member rail 84. In other words, hook-supporting member 83 is formed to move in parallel with the vertical direction indicated by arrow 131.

To hook-supporting member 83, open/close hook 80 serving as drive-unit grasping means is attached. Open/close hook 80 is formed at the top of the disassembling apparatus. Open/close hook 80 is formed to catch from above reduction-gear unit 66 when a disassembly unit 64 that is an object to be disassembled in the present embodiment is disposed while reduction-gear unit 66 serving as the drive unit is on the upper side. In other words, open/close hook 80 is formed to face downward.

Open/close hook 80 is formed to catch therein reduction-gear unit 66 in the front-and-rear direction of the disassembling apparatus. On both of the sides of open/close hook 80 in the front-and-rear direction of the disassembling apparatus, hook drive units 82 for opening/closing open/close hook 80 are formed respectively. Open/close hook 80 is formed to allow respective leading-ends of right and left claws to be movable in the direction indicated by arrow 132 and thus can be opened/closed.

At the bottom of the disassembling apparatus and on the upper side of bottom plate 94, a table 75 for disposing an object to be disassembled is formed. Table 75 is disposed below open/close hook 80. Components of the washing machine are disposed on a mount surface 76. Table 75 is formed to be extendable in the up-and-down direction. In other words, the table is formed so that mount plate 76 of table 75 can move in the up-and-down direction. Table 75 in the present embodiment has a first rise control function of allowing mount plane 76 to continuously rise and a second rise control function of allowing mount plate 76 by small distances, namely inching.

Figure 11:
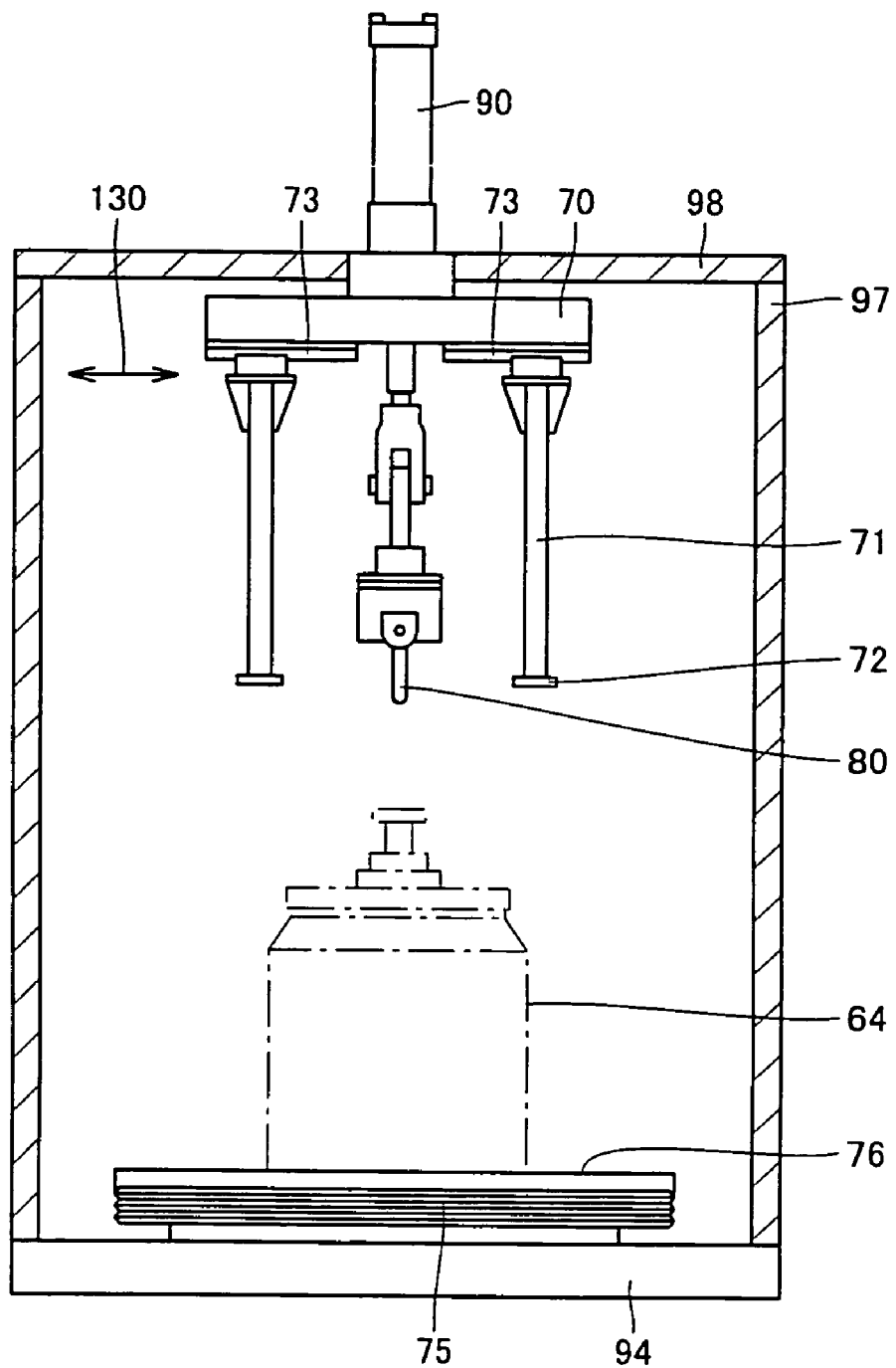
FIG. 11 is a partial cross-sectional view of the disassembling apparatus in the second embodiment as seen from the front.

FIG. 11 shows a partial cross-sectional view of the disassembling apparatus for a washing machine in the present embodiment as seen from the front. When the disassembling apparatus is seen from the front, open/close hook 80 and hydraulic cylinder 90 are formed to be located at a substantially central portion in the direction of the width. On both of the right and left sides of the disassembling apparatus, frame 97 is formed. Frame 97 on the side does not have a plate-shaped member like a lateral plate and the frame is formed to allow an object to be disassembled to be disposed on table 75 through the space between frames 97 from a side of the apparatus.

At the top of the disassembling apparatus, to top plate 98, a press-rod supporting member 70 is secured for supporting a press rod serving as vessel pressing means. Press-rod supporting member 70 has its longitudinal direction and formed so that the longitudinal direction is in parallel with the direction of the width of the disassembling apparatus. At press-rod supporting member 70, a press-rod rail 73 is formed. Press-rod rail 73 has its longitudinal direction disposed to be in parallel with the direction of the width of the disassembling apparatus.

Press rod 71 is formed on the lateral side of open/close hook 80. Press rod 71 is formed to have its upper end fit in press-rod rail 73 and is formed to be movable in the direction of the width of the disassembling apparatus as indicated by arrow 130. In other words, press rod 71 of the present embodiment is formed so that the position can be changed at which the bottom of disassembly unit 64 that is an object to be disassembled is pressed. At press rod 71, position fixing means (not shown) is formed and the position of press rod 71 with respect to press-rod rail 73 is fixed. At the leading end of press rod 71, a press plate 72 is formed.

Thus, the vessel pressing means in the present embodiment includes press rod 71 and press plate 72 and is formed to press the bottom of the vessel. Further, with reference to FIG. 11, for the structure having open-close hook 80 moving upward, the vessel pressing means in the present embodiment is formed to press the vessel downward.

Separating means in the present embodiment includes drive-unit grasping means and vessel pressing means and is formed to move the drive-unit grasping means by moving means while pressing the vessel by the vessel pressing means to allow force to be applied along the axial direction of a coupling rod in the direction of separating the drive unit and the driven unit from each other.

Figure 12:
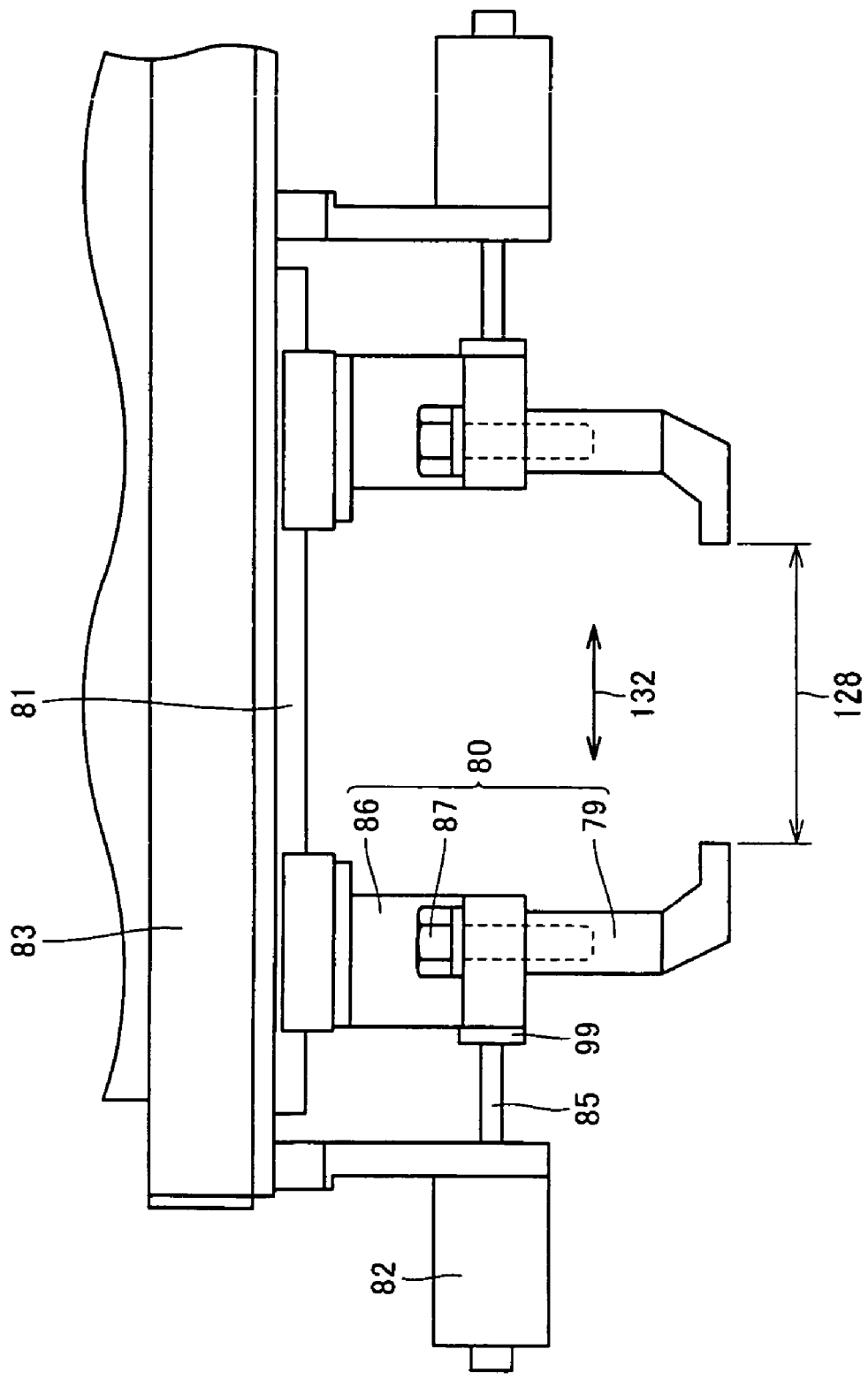
FIG. 12 is an enlarged view of an open/close hook of the disassembling apparatus in the second embodiment.

FIG. 12 shows a front view of the open/close hook serving as drive-unit grasping means. On the lower surface of hook supporting member 83, a hook moving rail 81 is formed with its longitudinal direction in parallel with the front-and-rear direction of the disassembling apparatus. Open/close hook 80 includes a hook's tip 79 that is a portion contacting the drive unit, a hook-rail fitting portion 86 that is a portion fitting in hook moving rail 81, and a bolt 87 for securing hook's tip 79 and hook-rail fitting portion 86. Open/close hook 80 is formed to open/close along hook moving rail 81 in the direction indicated by arrow 132. To open/close hook 80, elastic means including a spring is connected and force is applied to open the open/close hook 80 (not shown). Hook's tip 79 is formed to be replaceable by detaching nut 87.

In FIG. 12, on a lateral side of open/close hook 80, a hook drive unit 82 is formed. Hook drive unit 82 is formed to be able to press open/close hook 80 in the direction of closing open/close hook 80. Hook drive unit 82 includes a hook pressing portion 85 that is a portion contacting open/close hook 80. Hook pressing portion 85 is formed to extend and shrink. Hook pressing portion 85 has a rod-shaped member that moves in parallel and a plate-shaped member 99 that is a portion contacting open/close hook 80. Plate-shaped member 99 has its main surface contacting open/close hook 80. Hook pressing portion 85 is formed to extend for closing open/close hook 80 and shrink for opening open/close hook 80.

Since the aforementioned spring is connected to open/close hook 80, plate-shaped member 99 is always in contact with open/close hook 80. However, hook pressing portion 85 is not connected and secured to open/close hook 80 and merely plate-shaped member 99 is in surface contact with open/close hook 80. Open/close hook 80 in the present embodiment is formed to have the interval 128 between two hook's tips 79 of 180 mm in the state where the open/close hook is opened to the maximum degree.

Figure 13A:
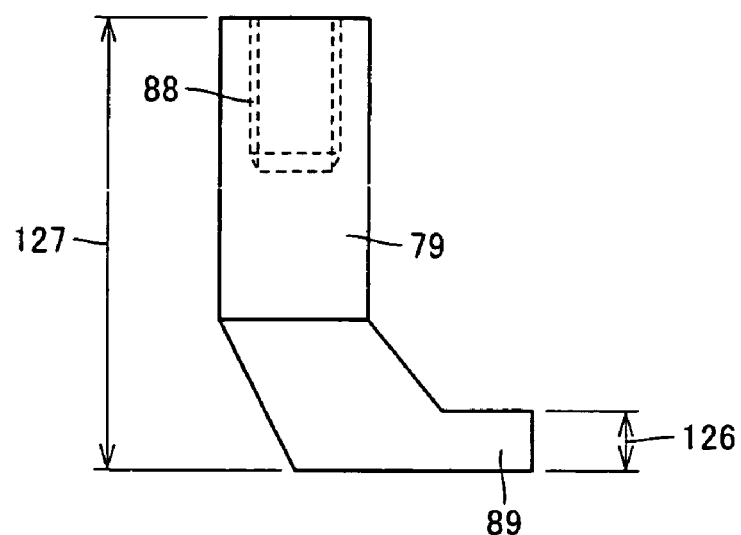
FIGS. 13A and 13B illustrate a leading-end portion of the open/close hook in the second embodiment.
Figure 13B:
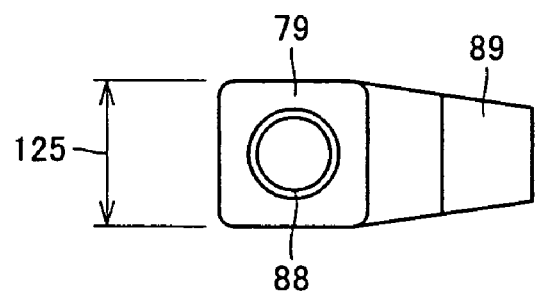

FIGS. 13A and 13B illustrate the hook's tip in the state where it is detached from the hook-rail fitting portion. FIG. 13A is a side view of the hook's tip and FIG. 13B is a top view of the hook's tip. Hook's tip 79 includes an internal thread portion 88 into which a threaded rod is screwed and a contact portion 89 that contacts the drive unit. Contact portion 89 is formed in the shape of a plate extending toward the inside of the disassembling apparatus and is formed to allow the main surface of contact portion 89 to be in parallel with the horizontal direction when attached to the hook-rail fitting portion. Hook's tip 79 is formed using, as its material, a carbon steel for machine structural use.

Further, contact portion 89 is formed so that the width thereof is smaller as approaching the leading end. The maximum width 125 of the hook's tip in the present embodiment is 40 mm. Further, hook's tip 79 is formed to have its height 127 of 104 mm. Contact portion 89 of the hook's tip is formed to have its thickness 126 of 16 mm.

Figure 14:
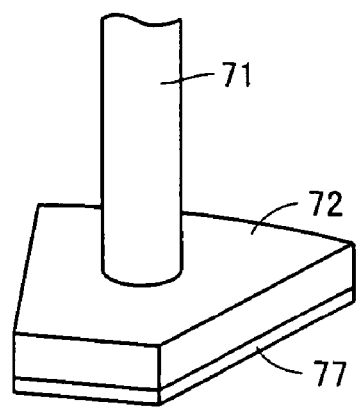
FIG. 14 illustrates vessel pressing means in the second embodiment.

FIG. 14 shows a perspective view of a leading end of the press rod in the present embodiment. At the leading end of press rod 71, press plate 72 is formed to have its main surface substantially perpendicular to the axial direction of press rod 71. Press plate 72 is formed in the shape, as seen in plan view, of almost sector. On the lower side of press plate 72 in the present embodiment, a serration member 77 is formed for preventing the water tub from sliding to be displaced in the release step. Serration member 77 is made of a metal and uneven in the shape of serration (sawtooth shape) on the surface of contact with the water tub. Thus, preferably any member is formed at the surface of contact between the press plate and the water tub to prevent the water tub and the press plate from sliding. Press plate 72 in the shape of a planar sector has a shorter arc and a longer arc and, in FIG. 11, the smaller arc extends toward open/close hook 80.

The disassembling apparatus in the present embodiment has a shatterproof plate formed to surround the frame (not shown). The shatterproof plate is formed of a plurality of plate-shaped members with the main surface extending in parallel with the vertical direction. The shatterproof plate has its height that is substantially the same as that of the frame.

Further, the disassembling apparatus in the present embodiment has drive-unit anti-fall means (not shown) for preventing the drive unit from falling when the open/close hook is opened after the release step is completed. The drive-unit anti-fall means in the present embodiment includes a metal wire secured to the frame and a detachable member that is detachable to/from the drive unit and that is secured to an end of the metal wire that is opposite to the end of the metal wire secured to the frame. The metal wire is formed to have its length allowing the detachable member to be attached to the drive unit when the disassembly is carried out. Further, the metal wire is formed to have its length that does not allow the drive unit to fall and reach the table when the release step is completed.

For disassembling the washing machine, a disassembly unit is first removed from the housing. "Disassembly unit" of the present invention refers to an object to be disassembled that is a vessel removed from the housing and that has accessories attached to the vessel, or the removed object to be disassembled from which a part of the attached accessories is detached.

Figure 15:
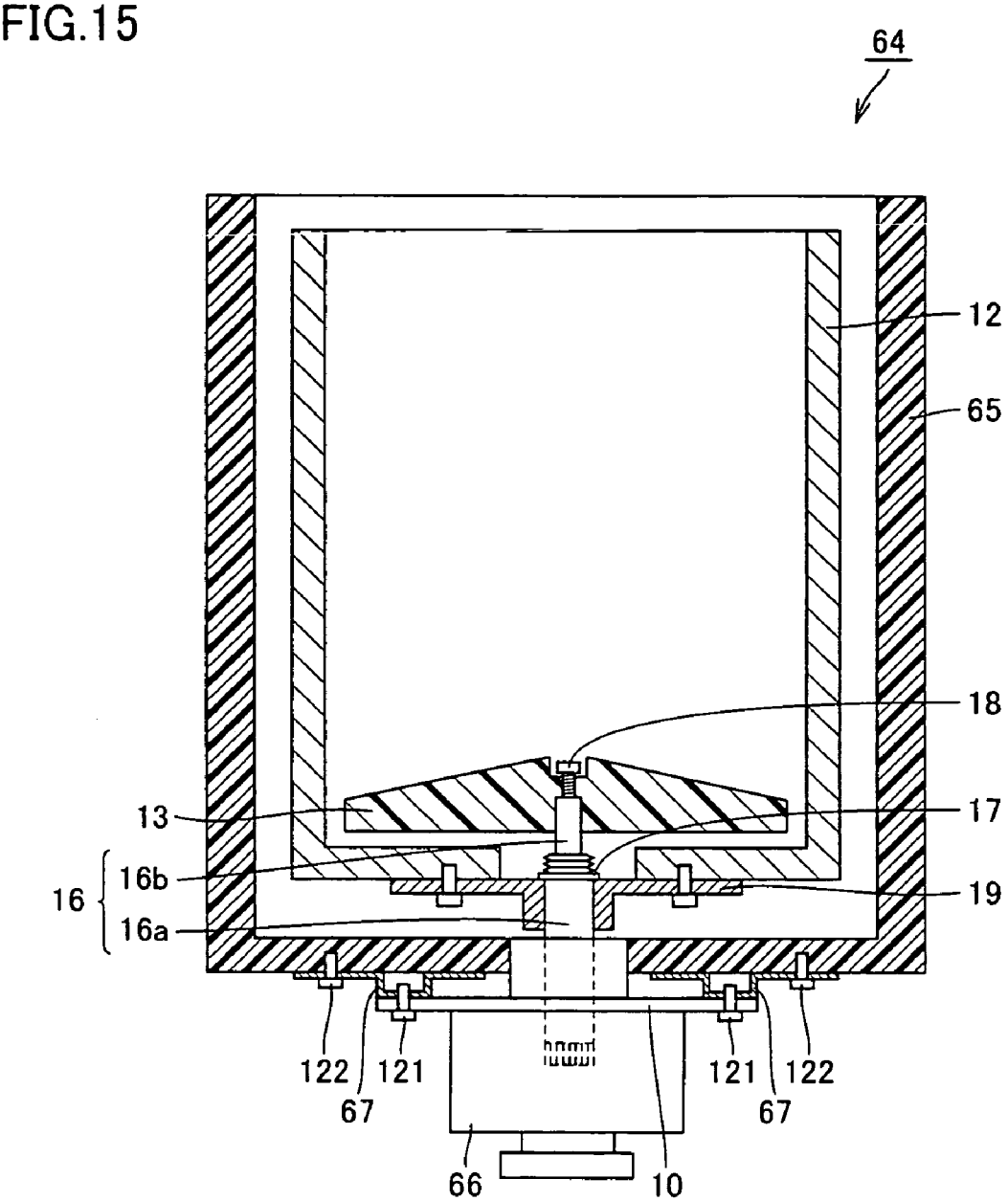
FIG. 15 is a cross-sectional view of a disassembly unit in the second embodiment.

FIG. 15 shows a cross-sectional view of a general disassembly unit that is a member to which the disassembling apparatus and the disassembling method of the present embodiment are applied. This disassembly unit 64 includes a water tub 65 that is a vessel formed of resin, a dehydration tub 12 that is a driven unit and makes rotational movements within water tub 65, and a reduction-gear unit 66 that is a drive unit disposed on the outside of water tub 65. Reduction-gear unit 66 and dehydration tub 12 are connected through a rotary shaft 16 that is a coupling rod. Between reduction-gear unit 66 and water tub 65, a reduction-gear frame 67 is formed for connecting reduction-gear unit 66 to water tub 65. Reduction-gear frame 67 is formed of metal. Reduction-gear frame 67 is coupled to water tub 65 with bolts 122. Reduction-gear unit 66 is coupled to reduction-gear frame 67 with bolts 121. A motor disposed on a lateral side of reduction-gear unit 66 and a belt for transmitting rotations of the motor to reduction-gear unit 66 for example are detached. It is noted that the designation by reference characters is similar to that for the water tub unit described herein in connection with the background art and structural components of the disassembly unit except for the aforementioned ones are designated similarly and the description thereof it not repeated.

In the present embodiment, bolts 122 are first detached to release the connection between reduction-gear frame 67 and water tub 65. This method can be employed to separate reduction-gear unit 66 that is a metal part and reduction-gear frame 67 that is a metal part all together in a later release step. In other words, metal parts can be separated at a time from water tub 65 made of resin and thus working efficiency is improved.

Then, as shown in FIGS. 10 and 11, disassembly unit 64 is disposed on mount surface 76 of table 75. As shown in FIG. 10, operator 120 performs operation while standing in front of the disassembling apparatus.

When disassembly unit 64 is disposed in the disassembling apparatus, preferably the disassembly unit is carried in from one of the lateral sides of the disassembling apparatus and carried out from the other side after being disassembled. This method can be employed to shorten the time required for carrying in/out the disassembly unit. As shown in FIG. 11, a side plate for example is not formed at the disassembling apparatus in the present embodiment. Therefore, disassembly unit 64 can be carried in and out from the space between the front rod-shaped frame 97 and the rear rod-shaped frame 97 (see FIG. 10). Thus, with the disassembling apparatus in the present embodiment, the unit can be carried in from one lateral side of the disassembling apparatus and carried out from the other side after disassembled, and thus the object to be disassembled can efficiently be carried in/out.

As shown in FIGS. 10 and 11, when disassembly unit 64 is disposed on table 75, table 75 is shrunk to the maximum degree. Mount surface 76 is at the lowest position. The disassembly unit is 12 to 20 kg in weight. Since mount surface 76 is lowered, disassembly unit 64 can easily be mounted on table 75.

Disassembly unit 64 is disposed in the state where reduction-gear unit 66 is on the upper side. Open/close hook 80 of the disassembling apparatus in the present embodiment is formed to catch reduction-gear unit 66 from above reduction-gear unit 66. In other words, open/close hook 80 faces downward. Thus, the disassembly unit is disposed on the table of the disassembling apparatus with the drive unit on the upper side and accordingly stability in the state where the disassembly unit is disposed on the table is improved. Further, adjustments of the height of the mount surface of the table in a later step are facilitated. Furthermore, since the open/close hook is at substantially the same height as that of the eyes of the operator, positional adjustments of the disassembly unit on the mount surface are easily made. Thus, the working time can be shortened and working efficiency is improved.

Disassembly unit 64 is positioned on mount surface 76 in the state where reduction-gear unit 66 is substantially directly below open/close hook 80. Positional adjustments at this time may be rough. In the present embodiment, the positional adjustments are made by placing an end of the opening of disassembly unit 64 with respect to concentric circles drawn on mount surface 76. The positional adjustments are made by holding disassembly unit 64 in both hands and moving it in the horizontal direction on mount surface 76.

Figure 16:
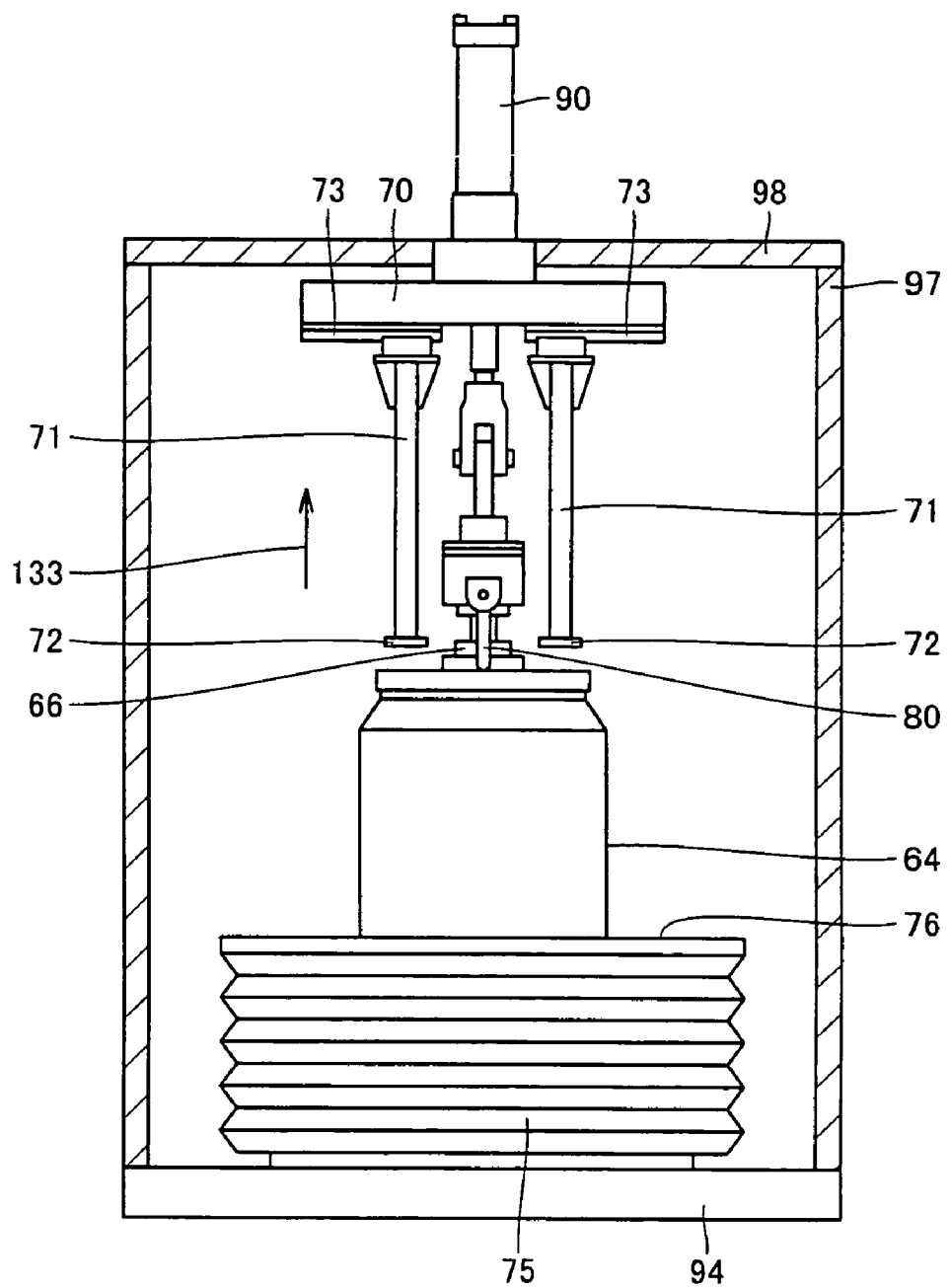
FIG. 16 illustrates a disassembly process in the second embodiment.

Then, as shown in FIG. 16, table 75 is moved upward to allow reduction-gear unit 66 and open/close hook 80 to be closer to each other and thereafter allow open/close hook 80 to catch reduction-gear unit 66. Since mount surface 76 of table 75 is formed to be movable in the up-and-down direction, the stroke of the hydraulic cylinder can be shortened. Further, instead of forming the table, the hydraulic cylinder and the open/close hook may be formed to be movable collectively and simultaneously in the up-and-down direction to achieve similar effects to the above-described ones.

The disassembling apparatus in the present embodiment has the first rise control function for allowing mount surface 76 to continuously rise. This structure can be employed to speedily raise mount surface 76 until reduction-gear unit 66 is located near open/close hook 80 and the time for matching respective heights of open/close hook 80 and reduction-gear unit 66 can be shortened.

When reduction-gear unit 66 reaches any position near open/close hook 80, fine adjustments are made to the position in the horizontal direction of disassembly unit 64 on mount surface 76. Then, the second rise control function for raising mount surface 76 by small distances is used to raise mount surface 76 and fine adjustments are made to the height of reduction-gear unit 66 with respect to open/close hook 80. Thus, the second rise control function can be used to easily make fine adjustments to the height and thereby improve working efficiency. The positional adjustments in the horizontal direction of disassembly unit 64 on mount surface 76 may be made while mount surface 76 is being lifted.

As for the table, a rise limit mechanism for stopping, at an upper limit, mount surface 76 from being raised by means of the first rise function, is preferably provided. This structure can be employed to prevent the first rise function from excessively raising mount surface 76 and causing open/close hook 80 and reduction-gear unit 66 to collide each other.

Figure 17:
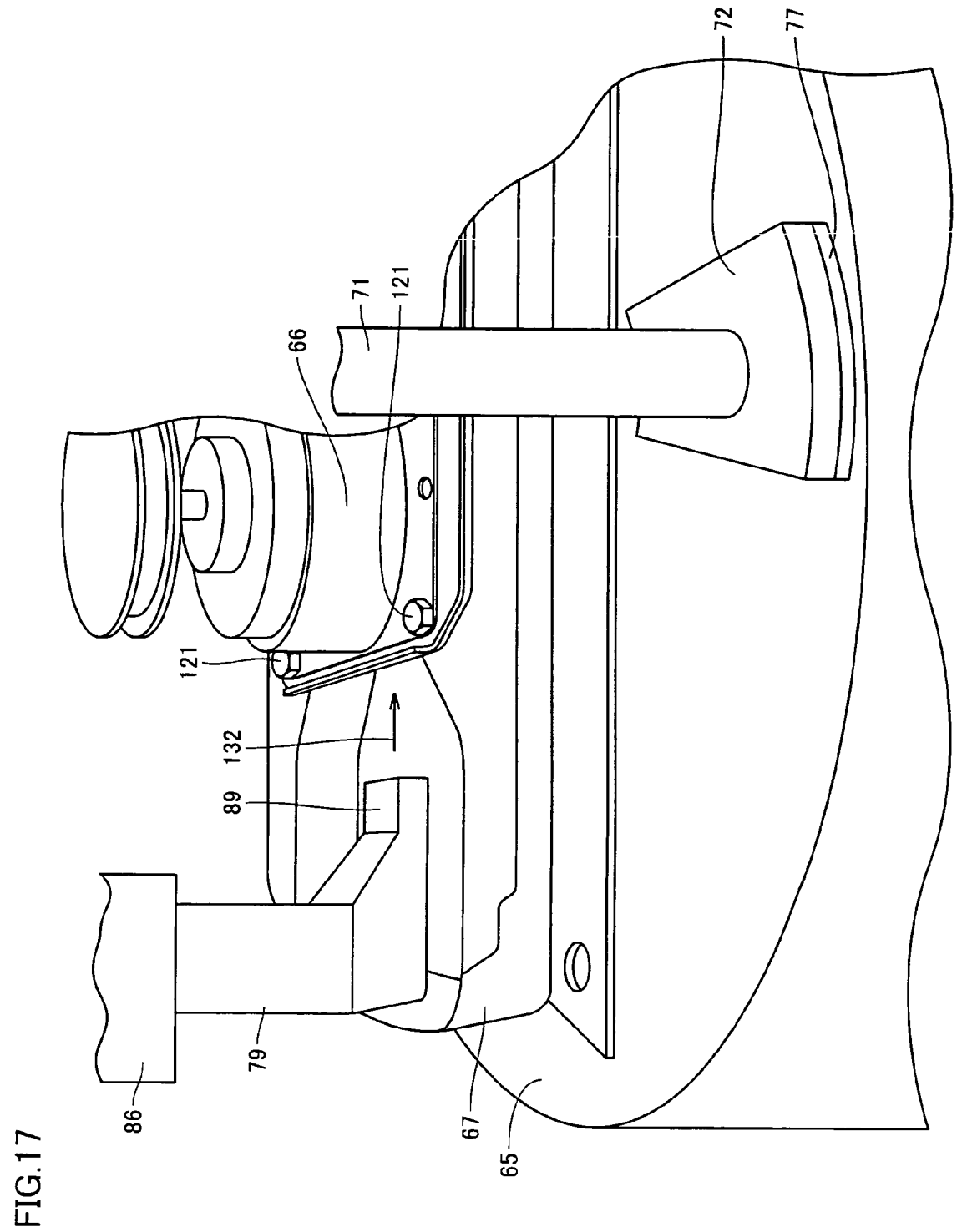
FIG. 17 illustrates that the open/close hook catches the reduction-gear unit in the second embodiment.

After adjustments to the height of the mount surface are made, as shown in FIG. 17, hook's tip 79 of the open/close hook catches reduction-gear unit 66. In the present embodiment, to the space formed between reduction-gear unit 66 and reduction-gear frame 67, contact portion 89 of hook's tip 79 is inserted as indicated by arrow 132. With reference to FIG. 12, the open/close hook is moved by driving hook drive unit 82. Hook drive unit 82 is driven to stretch hook press portion 85 to reduce interval 128 between hook's tips 79. The hook drive unit can thus be formed to close the open/close hook with a certain force. In addition, remote control can be made to improve working efficiency.

Then, in order to press the bottom of the disassembly unit at a proper position, the position of press rods 71 is adjusted. Press rods 71 in the present embodiment are each formed to be movable in the direction of the width of the disassembling apparatus (see FIG. 11). Since the press rods are formed in the direction of the width of the disassembling apparatus, the press rods are seen from the operator to be located in the lateral direction. Thus, the positional adjustments to the press rods are easily made. Moreover, since the press rods are formed to be movable, the disassembling apparatus here can be used for washing machines of various types. For example, some washing machines have the drive unit that is not disposed at a substantially central portion of the bottom of the vessel. For such washing machines, the press rods can be moved to press the disassembly unit at a proper position. When the position of the press rods are determined, fixing means is used to fix the position of the press rods on the press-rod rail.

The press rods in the present embodiment are formed to be movable in only the direction of the width of the disassembling apparatus. More preferably, the press rods are formed to be movable not only in the direction of the width of the disassembling apparatus but also in the front-and-rear direction of the disassembling apparatus. Alternatively, in such a case where a disassembly unit having a circular cross section as that of the present embodiment is disassembled, the press rods are preferably formed to be movable in the circumferential direction of the circle. Further, although the press rods in the present embodiment have a constant length in the axial direction, the press rods in the axial direction are preferably formed to be adjustable in length. Any of the above-described structures can be used to apply the disassembling apparatus to washing machines of more various types. Furthermore, the position of the press rods can easily be adjusted and the height of the mount surface can easily be adjusted to improve working efficiency. Alternatively, the position of the press rods may be fixed. This structure can be employed to easily structure the disassembling apparatus.

With reference to FIGS. 14 and 17, in the present embodiment, the press plate is formed at the leading end of the press rod. This structure can be employed to increase the area of contact for pressing the bottom surface of water tub 65 and thus stably press the water tub. For example, in such a case where the bottom of water tub 65 is thin, the press rod could pierce the bottom of water tub 65.

In another case, when the drive-unit grasping means raises the drive unit, the driven unit connected by the coupling rod could contact and press the inside of the bottom of water tub 65 to cause cracks, fractures or deformation to a substantial degree in the bottom of the water tub. Although the drive unit (reduction-gear unit 14) is preferably pulled out from the coupling rod (dehydration-tub rotary shaft 16a) as described in connection with the first embodiment, there could be the case where the drive unit and the coupling rod are firmly coupled due to corrosion for example of parts. In another case, the axial direction of the coupling rod and the pulling-out direction of open/close hook 80 do not accurately match. In other words, the direction of pulling is improper. There could be the case where, due to some reasons including the above-described factors, the drive unit cannot be pulled out from the coupling rod. In such a case, if the drive unit is pulled up by the drive-unit grasping means, the driven unit connected by the coupling rod contacts the inside of the bottom of water tub 65 while a strong press force is applied to cause considerable cracks, fractures or deformation to the bottom of the water tub in some cases.

If water tub 65 is broken as described above, characteristics of recovered resin could be deteriorated. In contrast, in the present embodiment, the press plate is formed at the vessel pressing means to increase the area of contact and stably press the water tub. Further, if the above-described coupling rod cannot be pulled apart from the drive unit, a press force can be applied from the outside of the bottom of water tub 65 that is on the other side with respect to the press force applied to the inside of the bottom of water tub 65 by the driven unit. Thus, the bottom of water tub 65 can be prevented from being broken as described above. Accordingly, without deterioration in resin characteristics, the water tub can be recovered at a high recovery ratio. With the structure of press plate 31 in the first embodiment can also be used to achieve similar effects and advantages.

In addition, the vessel pressing means in the present embodiment has serration member 77 formed at the main surface of press plate 72. This structure can be employed to prevent the water tub from sliding and prevent the water tub from moving in a later release step. In the present embodiment, the serration member is formed at the main surface of the press plate. However, the embodiment is not limited to this specific form. For example, any member that prevents the water tub and the press plate from sliding may be formed. For example, such an elastic member as rubber film may be formed. The elastic member can be formed at the press plate to increase the area of contact between the water tub and the vessel pressing means even in the case where the bottom of the water tub is uneven. Consequently, the release step can be carried out while cracks of the surface of the water tub with which the press plate is in contact or damages to the surface of the water tub are prevented and degradation in quality of resin to be recovered can be prevented. Alternatively, as the vessel pressing means, only the press rods may be formed and such a member as serration member or elastic member is formed at the leading end of the press rods each.

Then, as indicated by arrow 133 in FIG. 16, the release step is carried out in which open/close hook 80 is pulled up by hydraulic cylinder 90 and force is applied in the axial direction of the coupling rod that connects the drive unit and the driven unit to each other so as to release the connection between the drive unit and the driven unit. As open/close hook 80 is pulled up, disassembly unit 64 caught in open/close hook 80 is raised together with open/close hook 80. Among components of disassembly unit 64, the bottom of the water tub is brought into contact with serration member 77 formed at press plate 72 and the water tub is pressed in the direction opposite to the direction of the movement and accordingly the lifting is stopped. At this time, downward force is applied to the water tub. Thus, as the vessel pressing means for pressing the vessel in the direction opposite to the direction of movement of the drive-unit grasping means, the press rods are formed and accordingly the vessel pressing means can easily be formed.

Figure 18:
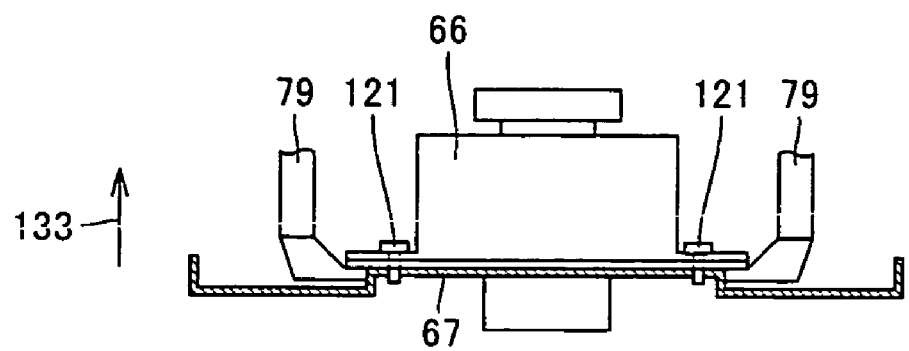
FIG. 18 illustrates the disassembly process in the second embodiment.
Figure 18:
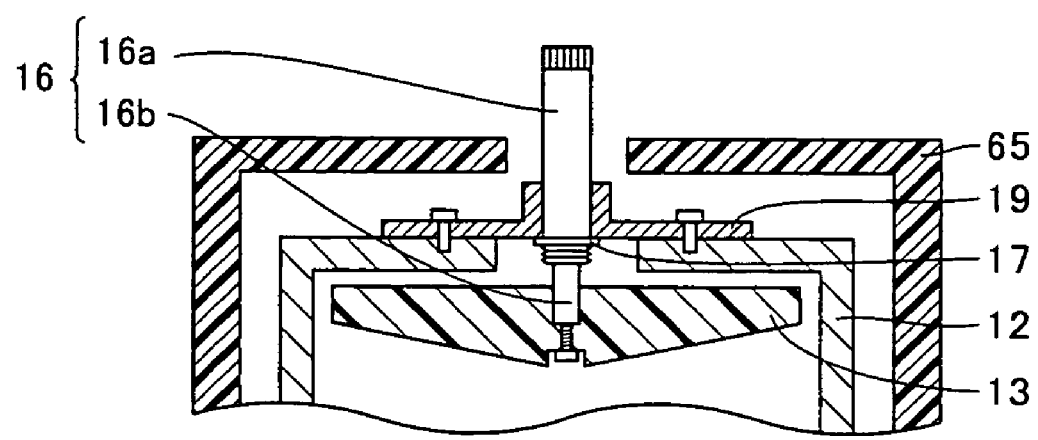

FIG. 18 shows a partial cross-sectional view showing the state where open/close hook 80 is continuously pulled up. While water tub 65 is pressed by the press rods (not shown), open/close hook 80 is lifted in the direction indicated by arrow 133. Rotary shaft 16 provided as the coupling rod is pulled off from reduction-gear unit 66 and the connection between the reduction-gear unit provided as the drive unit and dehydration tub 12 provided as the drive unit is released. The manner of detaching rotary shaft 16 from reduction-gear unit 66 is similar to the one in the first embodiment. In the present embodiment, reduction-gear frame 67 is still attached to reduction-gear unit 66. While reduction-gear frame 67 is caught in the open/close hook, water tub 65 and dehydration tub 12 coupled to pulsator 13 fall on the table.

In the present embodiment, prior to the release step, bolts connecting reduction-gear frame 67 and water tub 65 are detached. This method can be employed to pull out reduction-gear unit 14 in the state where reduction-gear unit 14 and reduction-gear frame 15 are coupled to each other, as described above (see FIG. 18).

With reference to FIG. 15, in the present embodiment, the coupling between water tub 11 and reduction-gear frame 67 is released prior to the release step. The embodiment is not limited to this particular form and bolts 121 securing reduction-gear unit 66 and reduction-gear frame 67 may be detached. In this case, in the release step, disassembling is carried out in the state where reduction-gear frame 67 is attached to water tub 65. This disassembling method is effective for example for a disassembly unit structured to have the reduction-gear frame that covers the entire bottom surface of the water tub.

Alternatively, in the case where the drive unit is directly connected to the vessel (the drive unit and the vessel are in contact with and coupled to each other), such securing members as bolts connecting the drive unit and the vessel to each other may be removed. For example, in the case where the reduction-gear unit provided as the drive unit is directly secured to the water tub without the reduction-gear frame therebetween, bolts securing the reduction-gear unit and the water tub are detached. In the release step, the coupling between such a driven unit as the dehydration tub and such a drive unit as the reduction-gear unit may be released to separate the drive unit and the vessel from each other.

Alternatively, without disengaging the coupling portion that directly or indirectly couples the drive unit and the vessel to each other, the subsequent release step may be carried out. In this case, the vessel is mainly broken and disassembling can be performed while a part of the vessel is attached to the drive unit or to metal parts connected to the drive unit. For example, regarding disassembly unit 64 shown in FIG. 15, the bottom of water tub 65 is broken in the release step and reduction-gear unit 66 and dehydration tub 12 can be separated from each other while a part of the water tub is attached to reduction-gear frame 67. However, since the portion secured by bolts is forced to be broken, the recovery ratio is lowered and characteristics of resin when recycled are deteriorated. Therefore, preferably the bolts connecting the vessel and metal parts are detached in advance.

Alternatively, the above-described methods of releasing the coupling may be carried out in combination. For example, in the case where a bolt 122 among a plurality of bolts 122 in FIG. 15 is fixed and cannot be detached, this bolt may be left and the remaining bolts 122 may be detached. In this case, in a later release step, water tub 65 is broken only at a part thereof around this single bolt 122 that cannot be detached, and reduction-gear unit 66 and water tub 65 can be separated from each other.

The release step in the present embodiment is carried out by catching the drive unit while the vessel is pressed to cause the drive unit and the vessel to be apart from each other. This method can be employed to easily apply force in the direction of separating the drive unit and the driven unit from each other.

Thus, the force is applied in the direction of separating the drive unit and the driven unit along the axial direction of the coupling rod, so that the connection between the drive unit and the driven unit can be released. Consequently, resin of the vessel can be recovered at a high recovery ratio. Further, recycled resin of high quality can be recovered.

When the release step as described above is completed, the table is moved down to the lowest point and the water tub and parts included in the water tub are carried out from the side, in the direction of the width of the disassembling apparatus, opposite to the side from which the disassembly unit is carried in. The open/close hook is opened to remove the reduction-gear unit from the open/close hook.

In the release step, in some cases, such oil as lubricant filling the drive unit could leak out to stick to the bottom for example of the water tub. In such a case, it is preferable that the leaking oil is removed by means of a vacuum pump for example after the release step. This method can be used to remove any component that deteriorates the quality of resin, included in the oil filling the drive unit, and thus resin of high quality can be recovered.

The disassembling apparatus and the disassembling method according to the present invention can easily release the coupling between the drive unit and the driven unit and dramatically improve working efficiency. For example, for conventional manual work, it is necessary, for separating only the water tub from the disassembly unit, to use special tools to push or hit. Thus the conventional manual disassembly requires heavy work for approximately five minutes. Further, regarding the recovery ratio of the resin, there could be such a case where the water tub has to be hit to be broken for disassembling or the disassembly has to be abandoned, and the recovery ratio is such a low ratio as approximately 30%. The disassembling apparatus or the disassembling method of the present invention can be used to reduce load on the work and separately remove the water tub only from the disassembly unit in approximately one minute. Further, the disassembling apparatus and the disassembling method of the present invention can recover resin in the vessel at a high recovery ratio. A demonstration experiment on the disassembling apparatus was conducted. Specifically, disassembly tests were conducted on approximately 900 washing machines including washing machines having special structures. As a result, resin could be recovered at a recovery ratio of approximately 95%.

Recycled resin recovered by the disassembling apparatus and the disassembling method of the present invention is superior in physical properties since there are few factors causing impurity to be mixed in the process of the disassembly. Further, a resin product formed using this recycled resin is good in quality since the recycled resin superior in physical properties is used.

The drive-unit grasping means includes the open/close hook formed to freely open/close as the one in the present embodiment and thus the drive unit can easily be caught and detached. In addition, the working time can be shortened to improve workability.

Referring to FIG. 12, open/close hook 80 is formed in the present embodiment to have the interval 128 between hook's tips 79 of 180 mm in the state where open/close hook 80 is opened to the maximum degree. For many washing machines, the measurement of the required interval between hook's tips 79 ranges from approximately 140 mm to approximately 180 mm. The interval 128 between two tips of open/close hook 80 can be set to 180 mm to allow most washing machines to be disassembled by means of the disassembling apparatus here.

Referring to FIGS. 13A and 13B, contact portion 89 of hook's tip 79 is formed in the shape of a plate. This structure can be used to catch the drive unit by surface contact and stably pull the drive unit. Contact portion 89 of hook's tip 79 is not limited to the plate-like member and any structure that can catch the drive unit can be used. For example, contact portion 89 may be rod-shaped member. Thus, the plate-shaped member or rod-shaped member can be used to catch the drive unit using a small space.

Further, hook's tips 79 are formed to be removable from the open/close hook. This structure can be used to apply, to any washing machine whose drive unit has a special shape, the disassembling apparatus here by replacing the hook's tips. In addition, even if hook's tips 79 are broken, they can easily be replaced.

In the present embodiment, the maximum width 125 of hook's tip 79 is 40 mm. Hook's tip 79 directly catches the drive unit and thus force is applied to the tip, and preferably the maximum width 125 of hook's tip 79 is larger. However, some washing machines have a drive unit on which a protrusion is provided. If the width 125 of hook's tip 79 is too large, the protrusion disturbs the open/close hook to hinder the open/close hook from catching the drive unit. The width of the open/close hook can be set to 40 mm as the one in the present embodiment to allow the open/close hook to catch the drive unit while avoiding the protrusion from the drive unit so that a further sufficient strength can be ensured.

Further, preferably the height 127 of hook's tip 79 is at least 70 mm. More preferably, the height 127 of hook's tip 79 is approximately 105 mm. This structure can be employed to allow the open/close hook to catch the drive unit, even if the drive unit has any protrusion, while avoiding such a protrusion.

Furthermore, preferably the thickness 126 of contact portion 89 is at least 15 mm and at most 25mm. The portion into which the open/close hook is inserted of many washing machines was measured to find that the height of the portion for insertion was at least approximately 30 mm and at most approximately 45 mm. Although a smaller thickness of contact portion 89 facilitates insertion, a too small thickness causes a problem in terms of strength. In order to make smaller the thickness of contact portion 89 while maintaining a certain strength, preferably the thickness 126 of contact portion 89 is at least 15 mm and at most 25 mm.

In the present embodiment, the hydraulic cylinder is formed to be able to lift the open/close hook at a speed of at least approximately 45 mm/sec and at most approximately 50 mm/sec: If the speed of pulling out the drive unit is too high, an excessive impact could be given to the disassembly unit to cause the disassembly unit to partially break. In contrast, if the speed of pulling out the drive unit is too low, the working efficiency lowers. In terms of these two respects, the speed of pulling out by the open/close hook is preferably at least 45 mm/sec and at most 50 mm/sec.

Further, preferably the force of lifting the open/close hook-of the hydraulic cylinder is at least 670 kg. This structure can be employed to easily disassemble many washing machines. The hydraulic cylinder in the present embodiment is formed to be able to pull out the drive unit with the force of at least 670 kg and at most 940 kg. Preferably, separating means has a larger separating force. However, if the separating force is to be increased, the separating means considerably increases in size or in cost. The separating force can be 940 kg to separate the drive unit and the driven unit from each other of most washing machines.

As shown in FIG. 12, hook pressing portion 85 in the present embodiment is not connected to be secured to open/close hook 80 but formed to contact open/close hook 80. In the release step in which the open/close hook catches the drive unit to apply force to the drive unit, depending on the positional relation between the open/close hook and the drive unit and the position at which the press rod presses, forces in various directions are applied to open/close hook 80. Since plate-shaped member 99 of hook drive unit 82 is not connected to be secured to open/close hook 80, hook pressing portion 85 can be prevented from breaking even when forces in various directions are exerted on open/close hook 80.

The disassembling apparatus for a washing machine in the present embodiment has the shatterproof plate formed to surround the frame. In the release step, a large force is exerted for releasing the connection between the drive unit and the driven unit. Thus, there could be the case where the water tub is broken in the release step to cause parts to scatter or parts connected to the drive unit to scatter. In such a case, the shatterproof member can prevent damages to operators or surrounding units from breaking. In the present embodiment, the shatterproof plate is formed around the frame. However, the embodiment is not limited to the specific form and the shatterproof plate may be formed around the separating means.

Further, the disassembling apparatus in the present embodiment has drive-unit anti-fall means for preventing the drive unit from falling when the open/close hook is opened after the release step is completed. This structure can be employed to make it unnecessary to support the drive unit when the open/close hook is opened so that the workability and stability in operation are improved.

Figure 19:
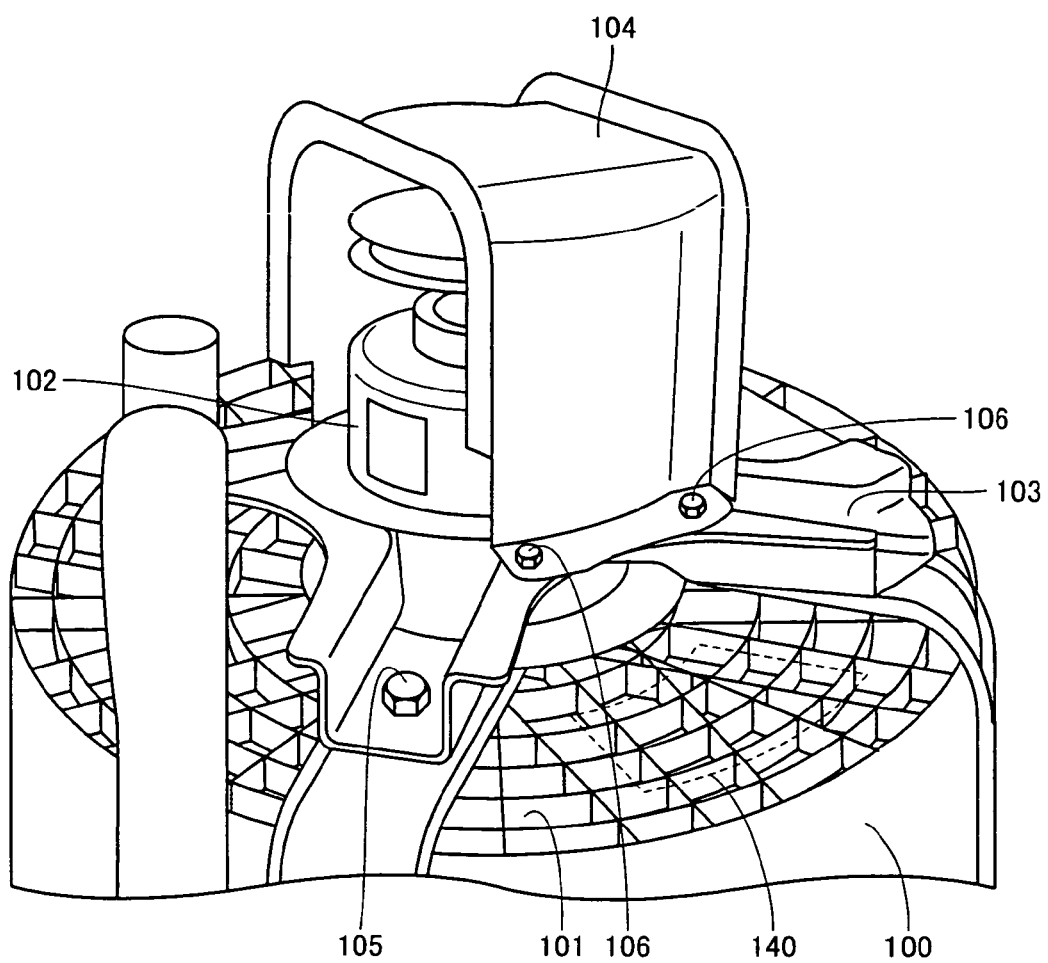
FIG. 19 is a perspective view of a characteristic disassembly unit in the second embodiment.
Figure 20:
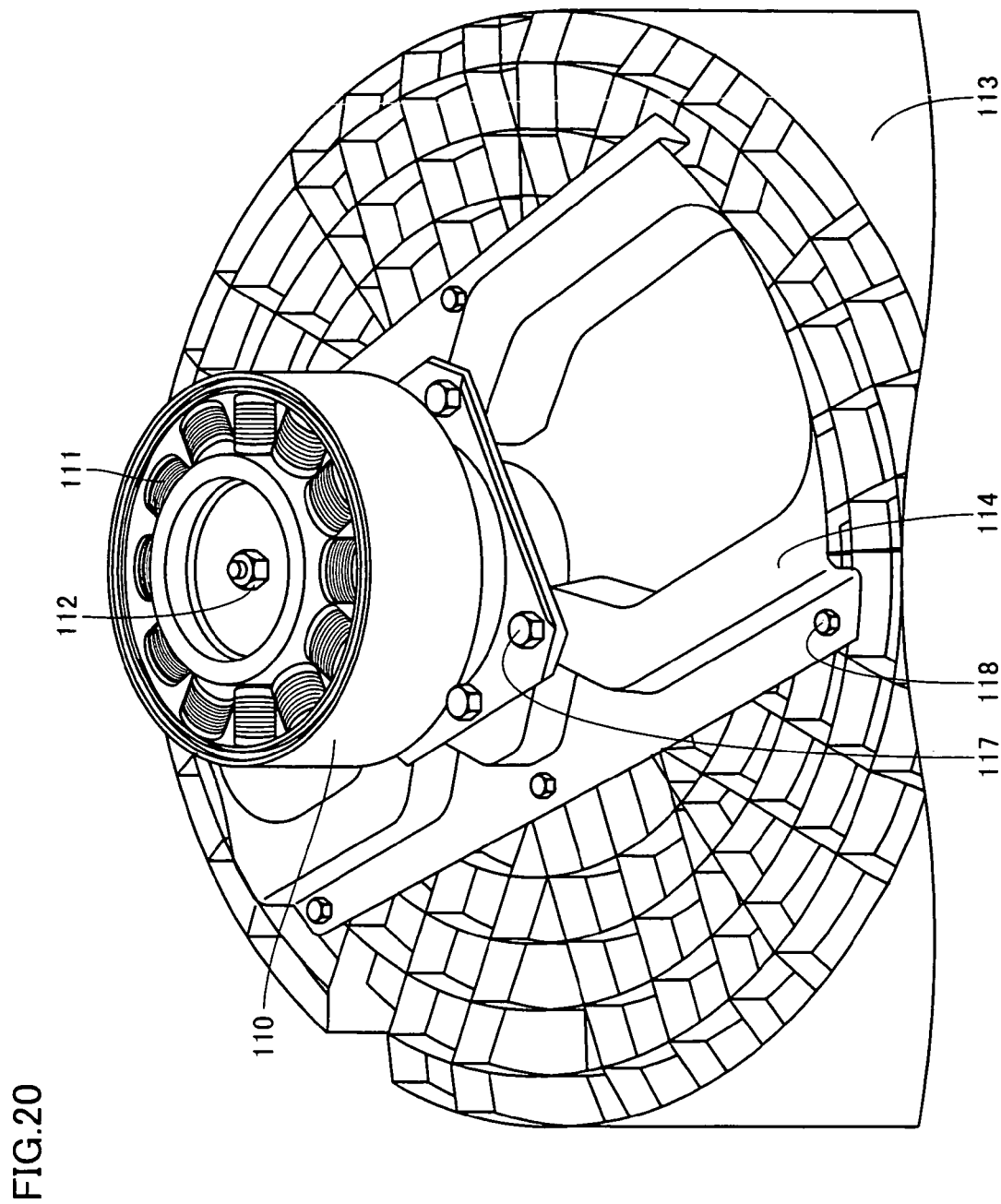
FIG. 20 is a perspective view of another characteristic disassembly unit in the second embodiment.

FIGS. 19 and 20 each illustrate a washing machine having a characteristic structure, among various types of washing machines. FIG. 19 is a perspective view of the bottom portion of the disassembly unit of the washing machine having the characteristic structure.

At the bottom of a water tub 100 of this washing machine, a rib 101 for increasing the strength is formed. As vessel pressing means, only a press rod may be formed. However, in the case where such a rib 101 is formed, the unevenness of the rib makes it difficult to determine the position of contact of the press rod, the press rod slides in the release step, or the press rod is inserted in any depressed portion of the rib to pass through water tub 100. As shown in FIG. 14, press plate 72 is formed at the leading end of the press rod to facilitate the positioning of the press rod even in such a case where the rib is formed at the bottom of the water tub. Moreover, since the area of contact between the vessel pressing means and the water tub is increased, a later release step can be performed stably.

Further, in FIG. 19, a reduction-gear frame 103 is formed in the shape of a cross as seen from the top in FIG. 19. Therefore, on the bottom surface of water tub. 100, a portion where the press plate is disposed 140 at which the vessel pressing means can contact is smaller. Even for such a disassembly unit, press plate 72 may have its shape in plan view that is substantially in the shape of a sector to increase the area of contact between the vessel pressing means and the bottom of the vessel and surely press the water tub.

Prior to the release step, preferably a bolt 105 is removed. This method can be employed to collectively and simultaneously separate reduction-gear unit 102 and reduction-gear frame 103, as done for the disassembly unit discussed above.

Further, the disassembly unit shown in FIG. 19 has a transport angle 104 formed around reduction-gear unit 102. Since transport angle 104 is a metal part, the angle is preferably separated from water tub 100 together with reduction-gear unit 102 in the release step. However, bolts 106 may be removed before the release step for separation in advance.

FIG. 20 is a perspective view of the bottom portion of a disassembly unit of another characteristic washing machine. This washing machine has, as a drive unit, a DD (Direct Drive) motor formed. The DD motor is a motor for directly rotating the drive unit without reduction gear. For the washing machine shown in FIG. 20, a DD motor frame 114 is attached to a water tub 113. In such a case, a top lid (not shown) of DD motor 110 is removed and further a nut 112 secured to a coupling rod is detached. Then, a coil 111 disposed inside is removed. In the case where DD motor frame 114 and DD motor 110 are to be detached all together, a bolt 118 connecting DD motor frame 114 and water tub 113 is detached. Alternatively, if separation is to be accomplished while DD motor frame 114 is attached to water tub 113, a bolt 117 is detached. In the release step, the DD motor is caught, which is similar to the disassembly of the washing machine having the reduction-gear unit. Regarding other process steps, they are similar to those for the washing machine having the reduction-gear unit. Therefore, the description thereof is not repeated.

In the present embodiment, pressure is applied to prevent the vessel from moving while the drive unit is caught to separate the drive unit and the vessel from each other. However, the embodiment is not limited to this particular form and one of the drive unit and the vessel may be pressed, held or caught and the other may be pressed, held or caught to separate them from each other.

Alternatively, each of the drive unit and the driven unit may be held, pressed or caught to separate the drive unit and the driven unit from each other. For example, regarding the disassembly unit shown in FIG. 15, reduction-gear unit 66 is held, dehydration tub 12 is held, and reduction-gear unit 66 and dehydration tub 12 are separated from each other along the axial direction of rotary shaft 16.

The separating means of the disassembling apparatus in the present embodiment includes drive-unit grasping means for catching the drive unit, vessel pressing means for pressing the vessel and moving means for moving at least one of the drive-unit grasping means and the vessel pressing means in the axial direction. However, the embodiment is not limited to this form and, instead of the drive-unit grasping means, drive-unit holding means for holding the drive unit may be formed. Further, instead of the vessel pressing means, vessel holding means for holding the vessel may be formed. Moving means in this case may be formed to separate the drive-unit holding means and the vessel holding means from each other in the axial direction.

Alternatively, the separating means may include one of drive-unit holding means and drive-unit grasping means and driven-unit holding means for holding the driven unit. In this case, the moving means may be formed to separate from each other one of the drive-unit holding means and the drive-unit grasping means and the driven-unit holding means in the axial direction of the coupling rod. Any of the above-discussed structures can be used to easily release the coupling between the drive unit and the driven unit and recover resin from the vessel at a high recovery ratio.

The drive unit includes, in addition to the reduction-gear unit, such a member as a motor for rotating the driven unit. Further, the driven unit includes, in addition to the dehydration tub, any component in the shape of a blade and a vessel-shaped component for preventing water from being discharged to the outside of the washing machine that receive mechanical power of the drive unit. For example, it includes the pulsator and a dehydration tub of a twin-tub washing machine. In the present embodiment, the coupling rod is formed to be substantially perpendicular to the bottom surface of the vessel. However, the state of disposition of the coupling rod is not limited to a particular form. For example, the coupling rod may be formed, on a side of the vessel, to be inclined relative to the surface of the side. Alternatively, when the pulsator is attached in an inclined state, the present invention can be applied.

According to the present invention, the apparatus and the method for disassembling a washing machine can be provided to recover resin included in the washing machine at a high recovery ratio. Further, a recycled resin of high quality and a resin product can be provided.

It is noted that the embodiments disclosed herein are by way of illustration and example in every respect and are not to be taken by way of limitation. The scope of the present invention is defined not by the description above but by the scope of claims, and includes all modifications within the meaning and scope equivalent to the scope of claims.

INDUSTRIAL APPLICABILITY

The present invention is applicable to disassembly of all types of washing machines.

The invention claimed is:

1. A disassembling method for disassembling a washing machine, the washing machine including:
    a vessel formed of resin and including a water tub;
    a driven unit including a dehydration tub and making a rotational movement in said vessel; and
    a drive unit including at least one of a motor and a reduction-gear unit, said drive unit being connected through a coupling rod to said driven unit and disposed on the outside of said vessel, and
    the method comprising a release step of applying force, along the axial direction of said coupling rod, in the direction of separating said drive unit and said driven unit from each other to release the connection between said drive unit and said driven unit, wherein
    said release step is carried out in a state where said coupling rod and said driven unit are secured, and
    in said release step, the force is applied in the direction of separating said drive unit and said driven unit from each other while a bottom of said vessel is pressed in a direction away from said drive unit, and said bottom of said vessel is pressed at a position opposite to a bottom of said driven unit.

2. The disassembling method for the washing machine according to claim 1, wherein
    in said release step, said drive unit is held, pressed or caught and said driven unit is held, pressed or caught to separate said drive unit and said driven unit away from each other.

3. The disassembling method for the washing machine according to claim 1, wherein
    in said release step, said drive unit is held, pressed or caught and said vessel is held, pressed or caught to separate said drive unit and said vessel away from each other.

4. The disassembling method for the washing machine according to claim 3, wherein
    said release step includes the step of bringing said driven unit into contact with the inside of said vessel, and in said release step, a portion of said vessel with which said driven unit is brought into contact is pressed in the direction opposite to the direction of movement of said driven unit.

5. The disassembling method for the washing machine according to claim 1, wherein
said release step includes the step of breaking a dehydration-tub flange coupling said coupling rod and said dehydration tub to each other.

6. A disassembling apparatus for disassembling a washing machine, the washing machine including:
a vessel formed of resin;
a driven unit making a rotational movement in said vessel; and
a drive unit connected through a coupling rod to said driven unit and disposed on the outside of said vessel,
the apparatus comprising separating means for applying force, along the axial direction of said coupling rod, in the direction of separating said drive unit and said driven unit from each other, and
said separating means including means for stopping one of said vessel or said driven unit and said drive unit and for separating the other from the one, wherein
said separating means applies the force in the direction of separating said drive unit and said driven unit from each other while a bottom of said vessel is pressed in a direction away from said drive unit, and said bottom of said vessel is pressed at a position opposite to a bottom of said driven unit.

7. The disassembling apparatus for the washing machine according to claim 6, wherein
said separating means includes:
drive-unit holding means for holding said drive unit;
driven-unit holding means for holding said driven unit; and
first moving means for moving, along said axial direction, at least one of said drive-unit holding means and said driven-unit holding means.

8. The disassembling apparatus for the washing machine according to claim 6, wherein
said separating means includes:
drive-unit grasping means for catching said drive unit;
driven-unit holding means for holding said driven unit; and
second moving means for moving, along said axial direction, at least one of said drive-unit grasping means and said driven-unit holding means.

9. The disassembling apparatus for the washing machine according to claim 8, wherein
said drive-unit grasping means includes an open/close hook formed to freely open and close, and said open/close hook has a leading end for catching said drive unit.

10. The disassembling apparatus for the washing machine according to claim 9, wherein
said drive-unit grasping means includes a hook drive unit for pressing said open/close hook in the direction of closing said open/close hook, and
said hook drive unit is formed to contact said open/close hook without being connected and secured to said open/close hook.

11. The disassembling apparatus for the washing machine according to claim 6, wherein
said separating means includes:
drive-unit holding means for holding said drive unit;
vessel holding means for holding said vessel; and
third moving means for moving, along said axial direction, at least one of said drive-unit holding means and said vessel holding means.

12. The disassembling apparatus for the washing machine according to claim 6, wherein
said separating means includes:
drive-unit grasping means for catching said drive unit;
vessel pressing means for pressing said vessel; and
fourth moving means for moving, along said axial direction, at least one of said drive-unit grasping means and said vessel pressing means.

13. The disassembling apparatus for the washing machine according to claim 12, wherein
said drive-unit grasping means includes an open/close hook formed to freely open and close, and said open/close hook has a leading end for catching said drive unit.

14. The disassembling apparatus for the washing machine according to claim 13, wherein
said drive-unit grasping means includes a hook drive unit for pressing said open/close hook in the direction of closing said open/close hook, and
said hook drive unit is formed to contact said open/close hook without being connected and secured to said open/close hook.

15. The disassembling apparatus for the washing machine according to claim 12, wherein
said vessel pressing means is formed to press said vessel toward one of the sides in said axial direction, and
said drive-unit grasping means is formed to move toward the other side.

16. The disassembling apparatus for the washing machine according to claim 15, wherein
said vessel pressing means includes a press rod formed to press a bottom portion of said vessel to be disposed.

17. The disassembling apparatus for the washing machine according to claim 6, said apparatus comprising a table for disposing an object to be disassembled, wherein
said table is formed to have a movable mount surface.

18. The disassembling apparatus for the washing machine according to claim 6, said apparatus comprising a shatter-proof plate formed to surround said separating means.

19. A disassembling apparatus for disassembling a washing machine,
the washing machine including:
a vessel formed of resin;
a driven unit making a rotational movement in said vessel; and
a drive unit connected through a coupling rod to said driven unit and disposed on the outside of said vessel,
the apparatus comprising separating means for applying force, along the axial direction of said coupling rod, in the direction of separating said drive unit and said driven unit from each other, wherein
said separating means applies the force in the direction of separating said drive unit and said driven unit from each other while a bottom of said vessel is pressed in a direction away from said drive unit, and said bottom of said vessel is pressed at a position opposite to a bottom of said driven unit, and
said separating means is formed to apply said force of at most 940 kg.

20. The disassembling apparatus for the washing machine according to claim 19, said apparatus comprising a table for mounting thereon an object to be disassembled, wherein
said table is formed to have a movable mount surface.

21. The disassembling apparatus for the washing machine according to claim 19, said apparatus comprising a shatter-proof plate formed to surround said separating means.

* * * * *